US010592268B2

(12) United States Patent
Nasu et al.

(10) Patent No.: US 10,592,268 B2
(45) Date of Patent: Mar. 17, 2020

(54) MANAGEMENT COMPUTER AND RESOURCE MANAGEMENT METHOD CONFIGURED TO COMBINE SERVER RESOURCES AND STORAGE RESOURCES AND ALLOCATE THE COMBINED RESOURCES TO VIRTUAL MACHINES

(71) Applicant: Hitachi, Ltd., Tokyo (JP)

(72) Inventors: Hiroshi Nasu, Tokyo (JP); Tomohiro Kawaguchi, Tokyo (JP); Yoshinori Ohira, Tokyo (JP); Shunji Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 15/544,528

(22) PCT Filed: Apr. 6, 2015

(86) PCT No.: PCT/JP2015/060722
§ 371 (c)(1),
(2) Date: Jul. 19, 2017

(87) PCT Pub. No.: WO2016/162916
PCT Pub. Date: Oct. 13, 2016

(65) Prior Publication Data
US 2018/0011728 A1    Jan. 11, 2018

(51) Int. Cl.
*G06F 9/455* (2018.01)
*G06F 9/50* (2006.01)
(Continued)

(52) U.S. Cl.
CPC .......... *G06F 9/45558* (2013.01); *G06F 3/067* (2013.01); *G06F 9/5027* (2013.01);
(Continued)

(58) Field of Classification Search
None
See application file for complete search history.

(56) References Cited

U.S. PATENT DOCUMENTS 7,380,163 B2 *  5/2008  Davies ................ G06F 11/1456
                                                      714/12
7,584,226 B2 *  9/2009  Fatula, Jr. ........... G06F 11/1464
(Continued)

FOREIGN PATENT DOCUMENTS

WO    2014/068764 A1    5/2014
WO    2015/162663 A     10/2015

OTHER PUBLICATIONS

Hirokazu Seto, Nikkei Windows for IT Professionals, the Jan. 2005 issue, Special Edition, Nikkei Bussiness Publications, Inc., Jan. 1, 2005, pp. 42-49.
(Continued)

*Primary Examiner* — Abu Zar Ghaffari
(74) *Attorney, Agent, or Firm* — Mattingly & Malur, PC

(57) ABSTRACT

The management computer has a memory which stores management information and management programs, and a CPU which refers to the management information and executes the management programs; the management information includes storage management information for allowing determination as to whether the plurality of storage resources can be paired in a redundant configuration, and couplable configuration management information for determining whether the plurality of storage resources and the plurality of server resources can be connected to each other; and when the CPU deploys a virtual machine, the CPU first determines, by reference to the storage management information, storage resources to be paired in a redundant configuration, then selects, by reference to the couplable configuration management information, server resources each of which can be connected to a respective one of the storage
(Continued)

resources that are to be paired in a redundant configuration, and pairs the selected server resources in the redundant configuration.

8 Claims, 21 Drawing Sheets

(51) Int. Cl.
 *G06F 11/20* (2006.01)
 *G06F 3/06* (2006.01)
 *G06F 11/18* (2006.01)
(52) U.S. Cl.
 CPC ............ *G06F 9/5077* (2013.01); *G06F 11/20* (2013.01); *G06F 11/181* (2013.01); *G06F 2009/4557* (2013.01); *G06F 2009/45579* (2013.01); *G06F 2009/45583* (2013.01); *G06F 2009/45595* (2013.01)

(56) References Cited

U.S. PATENT DOCUMENTS

| | | | | |
|---|---|---|---|---|
| 7,590,672 | B2 * | 9/2009 | Slik | G06F 3/0685 |
| 7,783,833 | B2 * | 8/2010 | Kumagai | G06F 11/1446 |
| | | | | 711/114 |
| 7,930,529 | B2 * | 4/2011 | Larcom | G06F 11/2025 |
| | | | | 711/100 |
| 8,190,852 | B2 * | 5/2012 | Honda | G06F 3/0605 |
| | | | | 711/114 |
| 8,352,482 | B2 * | 1/2013 | Hansen | G06F 11/2097 |
| | | | | 707/758 |
| 8,443,231 | B2 * | 5/2013 | Abraham | G06F 11/1425 |
| | | | | 709/220 |
| 8,806,301 | B2 * | 8/2014 | Yu | G06F 11/1072 |
| | | | | 714/773 |
| 8,880,774 | B2 | 11/2014 | Schmidt et al. | |
| 9,106,537 | B1 * | 8/2015 | Emelyanov | H04L 69/40 |
| 9,395,938 | B2 * | 7/2016 | Tsukahara | G06F 3/0619 |
| 2002/0083036 | A1 * | 6/2002 | Price | G06F 11/2028 |
| 2005/0172073 | A1 * | 8/2005 | Voigt | G06F 3/0613 |
| | | | | 711/114 |
| 2008/0168221 | A1 * | 7/2008 | Ballew | G06F 11/2089 |
| | | | | 711/113 |
| 2009/0222560 | A1 * | 9/2009 | Gopisetty | G06F 8/60 |
| | | | | 709/226 |
| 2010/0064103 | A1 * | 3/2010 | Matsui | G06F 11/1096 |
| | | | | 711/114 |
| 2011/0179231 | A1 * | 7/2011 | Roush | G06F 3/0622 |
| | | | | 711/152 |
| 2012/0047265 | A1 * | 2/2012 | Agarwala | G06F 9/5072 |
| | | | | 709/226 |
| 2013/0080559 | A1 * | 3/2013 | Rao | H04L 67/1097 |
| | | | | 709/208 |
| 2013/0162444 | A1 * | 6/2013 | Boulanger | H04Q 9/00 |
| | | | | 340/870.03 |
| 2013/0290541 | A1 | 10/2013 | Hatasaki et al. | |
| 2014/0052864 | A1 * | 2/2014 | Van Der Linden | G06F 9/5077 |
| | | | | 709/226 |
| 2014/0244573 | A1 * | 8/2014 | Gonsalves | G06F 16/283 |
| | | | | 707/606 |
| 2014/0258608 | A1 * | 9/2014 | Viswanatha | G06F 12/0873 |
| | | | | 711/113 |
| 2014/0337665 | A1 * | 11/2014 | Ogihara | G06F 11/1092 |
| | | | | 714/6.21 |
| 2015/0012704 | A1 | 1/2015 | Watanabe et al. | |
| 2015/0205650 | A1 | 7/2015 | Shimada et al. | |
| 2015/0227318 | A1 * | 8/2015 | Banka | G06F 3/0617 |
| | | | | 709/202 |
| 2015/0234692 | A1 * | 8/2015 | Chu | G11C 29/72 |
| | | | | 714/704 |
| 2017/0054802 | A1 * | 2/2017 | Annamalai | H04L 67/1095 |
| 2018/0011728 | A1 * | 1/2018 | Nasu | G06F 9/5027 |

OTHER PUBLICATIONS

International Search Report of PCT/JP2015/060722 dated Jul. 7, 2015.

* cited by examiner

Fig. 5

| Storage ID (33011) | Vendor name (33012) |
|---|---|
| Storage1 | A |
| Storage2 | B |

| Pool ID (33021) | Storage ID (33022) | Total capacity (GB) (33023) | Free capacity (GB) (33024) |
|---|---|---|---|
| Pool1 | Storage1 | 1000 | 990 |
| Pool2 | Storage2 | 800 | 700 |

| VOL ID (33031) | Pool ID (33032) | Capacity (GB) (33033) |
|---|---|---|
| Q-A1 | Pool1 | 10 |
| VOL1 | Pool2 | 100 |

| Pool ID | Pair type | The other pool ID |
|---|---|---|
| Pool1.Storage1 | HA | Pool5.Storage5 |
| Pool1.Storage1 | HA | Pool7.Storage7 |
| Pool2.Storage2 | HA | Pool3.Storage3 |
| Pool2.Storage2 | HA | Pool8.Storage8 |

33040 — 33041 Pool ID, 33042 Pair type, 33043 The other pool ID

Fig. 9

| VOL pair ID | VOL ID | Pair type | VOL type | Pair state | The other VOL ID | Quorum ID | Grp ID |
|---|---|---|---|---|---|---|---|
| VOLpair1 | VOL1 | HA | PVOL | PAIR | VOL2.Pool3.Storage3 | Q-B1.Pool6.Storage6 | 1.Storage1 |
| VOLpair2 | Q-A1 | HA | Quorum | - | - | - | - |

33050 — 33051 VOL pair ID, 33052 VOL ID, 33053 Pair type, 33054 VOL type, 33055 Pair state, 33056 The other VOL ID, 33057 Quorum ID, 33058 Grp ID

Fig. 10

| Host ID |
|---|
| Host 1 |
| Host 2 |

| Hypervisor ID | Hypervisor name | Host ID |
|---|---|---|
| Hypervisor1 | X | Host 1 |
| Hypervisor2 | Y | Host 2 |

| VM ID | Hypervisor ID | Connected VOL ID |
|---|---|---|
| VM1 | Hypervisor1 | VOL1.Pool2.Storage2 |

| Hypervisor ID | The other hypervisor ID | Pair type |
|---|---|---|
| Hypervisor1.Host1 | Hypervisor3.Host3 | HA |
| Hypervisor1.Host1 | Hypervisor6.Host6 | HA |
| Hypervisor2.Host2 | Hypervisor4.Host4 | HA |
| Hypervisor2.Host2 | Hypervisor7.Host7 | HA |

| VM pair ID | VM ID | Pair type | Pair state | VM state | The other hypervisor ID | Quorum ID |
|---|---|---|---|---|---|---|
| VMpair1 | VM1 | HA | PAIR | Active | Hypervisor1.Host3 | Q-X1.Pool8.Storage8 |

| Storage ID | Connected host ID |
|---|---|
| Storage1 | Host1 |
| Storage1 | Host2 |
| Storage2 | Host1 |
| Storage2 | Host2 |

| Storage ID | Vendor name | Data center ID |
|---|---|---|
| Storage1 | A | Datacenter1 |
| Storage2 | B | Datacenter1 |
| Storage3 | B | Datacenter2 |
| Storage4 | C | Datacenter2 |
| Storage5 | A | Datacenter3 |
| Storage6 | C | Datacenter3 |
| Storage7 | A | Datacenter4 |
| Storage8 | B | Datacenter4 |

Fig. 17

| Pool ID | Storage ID | Total capacity (GB) | Free capacity (GB) |
|---|---|---|---|
| Pool1 | Storage1 | 1000 | 990 |
| Pool2 | Storage2 | 800 | 700 |
| Pool3 | Storage3 | 1200 | 1100 |
| Pool4 | Storage4 | 900 | 890 |
| Pool5 | Storage5 | 1500 | 1300 |
| Pool6 | Storage6 | 1000 | 990 |
| Pool7 | Storage7 | 1100 | 900 |
| Pool8 | Storage8 | 1200 | 1190 |

Fig. 18

| VOL ID | Pool ID | Storage ID | Capacity (GB) |
|---|---|---|---|
| Q-A1 | Pool1 | Storage1 | 10 |
| VOL1 | Pool2 | Storage2 | 100 |
| VOL2 | Pool3 | Storage3 | 100 |
| Q-Z1 | Pool4 | Storage4 | 10 |
| VOL3 | Pool5 | Storage5 | 200 |
| Q-B1 | Pool6 | Storage6 | 10 |
| VOL4 | Pool7 | Storage7 | 200 |
| Q-X1 | Pool8 | Storage8 | 10 |

Fig. 19

| First pool ID | Second pool ID | Pair type |
|---|---|---|
| Pool1.Storage1 | Pool5.Storage5 | HA |
| Pool1.Storage1 | Pool7.Storage7 | HA |
| Pool2.Storage2 | Pool3.Storage3 | HA |
| Pool2.Storage2 | Pool8.Storage8 | HA |
| Pool3.Storage3 | Pool8.Storage8 | HA |
| Pool4.Storage4 | Pool6.Storage6 | HA |
| Pool5.Storage5 | Pool7.Storage7 | HA |

Fig. 20

| VOL pair ID | Pair type | Pair state | PVOL ID | SVOL ID | Quorum ID | Grp ID |
|---|---|---|---|---|---|---|
| VOLpair1 | HA | PAIR | VOL1 .Pool2 .Storage2 | VOL2 .Pool3 .Storage3 | Q-B1 .Pool6 .Storage6 | 1 .Storage2 |
| VOLpair2 | HA | PAIR | VOL3 .Pool5 .Storage5 | VOL4 .Pool7 .Storage7 | Q-A1 .Pool1 .Storage1 | 2 .Storage5 |

Fig. 21

Table 33260

| Host ID | Data center ID |
|---|---|
| Host1 | Datacenter1 |
| Host2 | Datacenter1 |
| Host3 | Datacenter2 |
| Host4 | Datacenter2 |
| Host5 | Datacenter3 |
| Host6 | Datacenter3 |
| Host7 | Datacenter4 |
| Host8 | Datacenter4 |

Columns: 33261, 33262

Fig. 22

Table 33270

| Hypervisor ID | Hypervisor name | Host ID |
|---|---|---|
| Hypervisor1 | X | Host1 |
| Hypervisor2 | Y | Host2 |
| Hypervisor3 | X | Host3 |
| Hypervisor4 | Y | Host4 |
| Hypervisor5 | Z | Host5 |
| Hypervisor6 | X | Host6 |
| Hypervisor7 | Y | Host7 |
| Hypervisor8 | Z | Host8 |

Columns: 33271, 33272, 33273

Fig. 23

Table 33280

| VM ID | Hypervisor ID | Connected VOL ID |
|---|---|---|
| VM1 | Hypervisor1.Host1 | VOL1.Pool2.Storage2 |
| VM1 | Hypervisor3.Host3 | VOL2.Pool3.Storage3 |
| VM2 | Hypervisor5.Host5 | VOL3.Pool5.Storage5 |
| VM2 | Hypervisor8.Host8 | VOL4.Pool7.Storage7 |

Columns: 33281, 33282, 33283

Fig. 24

Table 33290

| First hypervisor ID | Second hypervisor ID | Pair type |
|---|---|---|
| Hypervisor1.Host1 | Hypervisor3.Host3 | HA |
| Hypervisor1.Host1 | Hypervisor6.Host6 | HA |
| Hypervisor2.Host2 | Hypervisor4.Host4 | HA |
| Hypervisor2.Host2 | Hypervisor7.Host7 | HA |
| Hypervisor3.Host3 | Hypervisor6.Host6 | HA |
| Hypervisor4.Host4 | Hypervisor7.Host7 | HA |
| Hypervisor5.Host5 | Hypervisor8.Host8 | HA |

Columns: 33291, 33292, 33293

Fig. 25

| VM pair ID | Pair type | Pair state | First VM ID | First VM state | Second VM ID | VM state | Quorum ID |
|---|---|---|---|---|---|---|---|
| VMpair1 | HA | PAIR | VM1.Hypervisor1.Host1 | Active | VM1.Hypervisor3.Host3 | Standby | Q-X1.Pool8.Storage8 |
| VMpair2 | HA | PAIR | VM2.Hypervisor5.Host5 | Active | VM2.Hypervisor8.Host8 | Standby | Q-Z1.Pool4.Storage4 |

Fig. 26

| Storage ID | Connected host ID |
|---|---|
| Storage1 | Host1 |
| Storage1 | Host2 |
| Storage2 | Host1 |
| Storage2 | Host2 |
| Storage3 | Host3 |
| Storage3 | Host4 |
| Storage4 | Host3 |
| Storage4 | Host4 |
| Storage5 | Host5 |
| Storage5 | Host6 |
| Storage6 | Host5 |
| Storage6 | Host6 |
| Storage7 | Host7 |
| Storage7 | Host8 |
| Storage8 | Host7 |
| Storage8 | Host8 |

MANAGEMENT COMPUTER AND RESOURCE MANAGEMENT METHOD CONFIGURED TO COMBINE SERVER RESOURCES AND STORAGE RESOURCES AND ALLOCATE THE COMBINED RESOURCES TO VIRTUAL MACHINES

TECHNICAL FIELD

This invention relates to a computer system using a server and a storage.

BACKGROUND ART

In recent years, cloud computing has become popular as a system having a form different from a computer system of the related art. The cloud computing is classified into a SaaS (Software as a Service), a PaaS (Platform as a Service), and an IaaS (Infrastructure as a Service) depending on the provided service. In the cloud computing, management of resources is important for enhancement of availability and reliability, and for achievement of flexibility for system extension, and hence various kinds of research and development have been conducted.

The cloud computing of the IaaS is provided by a computer system in which a server and a storage are connected to each other. PTL 1 and PTL 2 are provided as literatures disclosing technologies relating to the availability of the server and the storage. PTL 1 discloses a technology of achieving a high availability (HA: High Availability) of the server in the IaaS. PTL 2 discloses a technology of achieving a high availability of the storage in the IaaS.

CITATION LIST

Patent Literature

[PTL 1]
U.S. Patent Application Publication No. 8880774
[PTL 2]
PCT/JP2014/061151

SUMMARY OF INVENTION

Technical Problem

In a computer system providing an IaaS, it is conceivable to enhance the availability as a system by combining the high availability technology on the server side and the high availability technology on the storage side of the related-art.

However, although the high availability technology of the server and the one of the storage are each considered as above, a high availability technology of associating the server and the storage with each other does not exist.

When an environment in which a redundant configuration (high availability configuration (HA configuration)) is formed on both the server side and the storage side, restrictions are imposed on the HA configuration due to apparatuses of the system in the deployment of a VM (Virtual Machine). Whether the HA configuration can be formed in the storage is highly dependent on a storage vendor. The HA configuration of storages may not be formed if storages are not manufactured by the same storage vendor.

In general, in the IaaS, management and allocation of the resources are started on the server side. When this is applied to the construction of the HA configuration in which the server and the storage are associated with each other, the HA configuration on the server side is formed and then the HA configuration on the storage side is formed.

However, in some cases, the HA configuration cannot be constructed between storage devices manufactured by different storage vendors due to differences in the specifications. When it is discovered that the HA configuration on the storage side cannot be constructed after the HA configuration on the server side is constructed, the construction processing needs to be redone from the HA configuration on the server side needs.

In many cases, users of the IaaS request VM (Virtual Machine) deployments which allow a large amount of the VMs at once. Further, it is required to increase the speed of the processing of the VM deployment as much as possible. However, in the method of constructing the HA configuration as described above, the deployment processing is delayed and the time for keeping the users waiting is increased.

This invention has an object to provide a technology enabling efficient construction of a redundant configuration in which a server and a storage are associated with each other.

Solution to Problem

A management computer according to one embodiment of this invention is a management computer configured to manage resources of a computer system which has a plurality of server resources and a plurality of storage resources and which is configured to combine the server resources and the storage resources and allocate the combined resources to virtual machines, the management computer including: a memory configured to store management information and management programs; and a CPU configured to refer to the management information and execute the management program. The management information includes storage management information for allowing determination as to whether the plurality of storage resources can be paired in a redundant configuration, and also includes couplable configuration management information for allowing determination as to whether the plurality of storage resources and the plurality of server resources can be connected to each other. The CPU is configured to, when deploying the virtual machine, first determine storage resources to be paired in a redundant configuration by reference to the storage management information, then select, by reference to the couplable configuration management information, server resources each of which can be connected to a respective one of the storage resources to be paired in the redundant configuration, and pair the selected server resources in the redundant configuration.

Advantageous Effects of Invention

According to this invention, the redundant configuration in which the server and the storage are associated with each other can be constructed efficiently because the redundant configuration of the storage in which restrictions are often imposed on the redundant configuration is determined first and the redundant configuration of the server is determined next.

BRIEF DESCRIPTION OF DRAWINGS

FIG. 5 is a diagram illustrating a configuration example of a storage management table 33010.

FIG. 6 is a diagram illustrating a configuration example of a pool management table 33020.

FIG. 7 is a diagram illustrating a configuration example of a volume management table 33030.

FIG. 8 is a diagram illustrating a configuration example of a volume pair generatable configuration management table 33040.

FIG. 9 is a diagram illustrating a configuration example of a volume pair management table 33050.

FIG. 10 is a diagram illustrating a configuration example of a host management table 33110.

FIG. 11 is a diagram illustrating a configuration example of a hypervisor management table 33120.

FIG. 12 is a diagram illustrating a configuration example of a virtual machine management table 33130.

FIG. 13 is a diagram illustrating a configuration example of a virtual machine pair generatable configuration management table 33140.

FIG. 14 is a diagram illustrating a configuration example of a virtual machine pair management table 33150.

FIG. 15 is a diagram illustrating a configuration example of a storage-host couplable configuration management table 33160.

FIG. 16 is a diagram illustrating a configuration example of an all storage management table 33210.

FIG. 17 is a diagram illustrating a configuration example of an all pool management table 33220.

FIG. 18 is a diagram illustrating a configuration example of an all volume management table 33230.

FIG. 19 is a diagram illustrating a configuration example of an all volume pair generatable configuration management table 33240.

FIG. 20 is a diagram illustrating a configuration example of an all volume pair management table 33250.

FIG. 21 is a diagram illustrating a configuration example of an all host management table 33260.

FIG. 22 is a diagram illustrating a configuration example of an all hypervisor management table 33270.

FIG. 23 is a diagram illustrating a configuration example of an all virtual machine management table 33280.

FIG. 24 is a diagram illustrating a configuration example of an all virtual machine pair generatable configuration management table 33290.

FIG. 25 is a diagram illustrating a configuration example of an all virtual machine pair management table 33300.

FIG. 26 is a diagram illustrating a configuration example of an all storage-host couplable configuration management table 33310.

DESCRIPTION OF EMBODIMENTS

Embodiment 1

Figure 1:
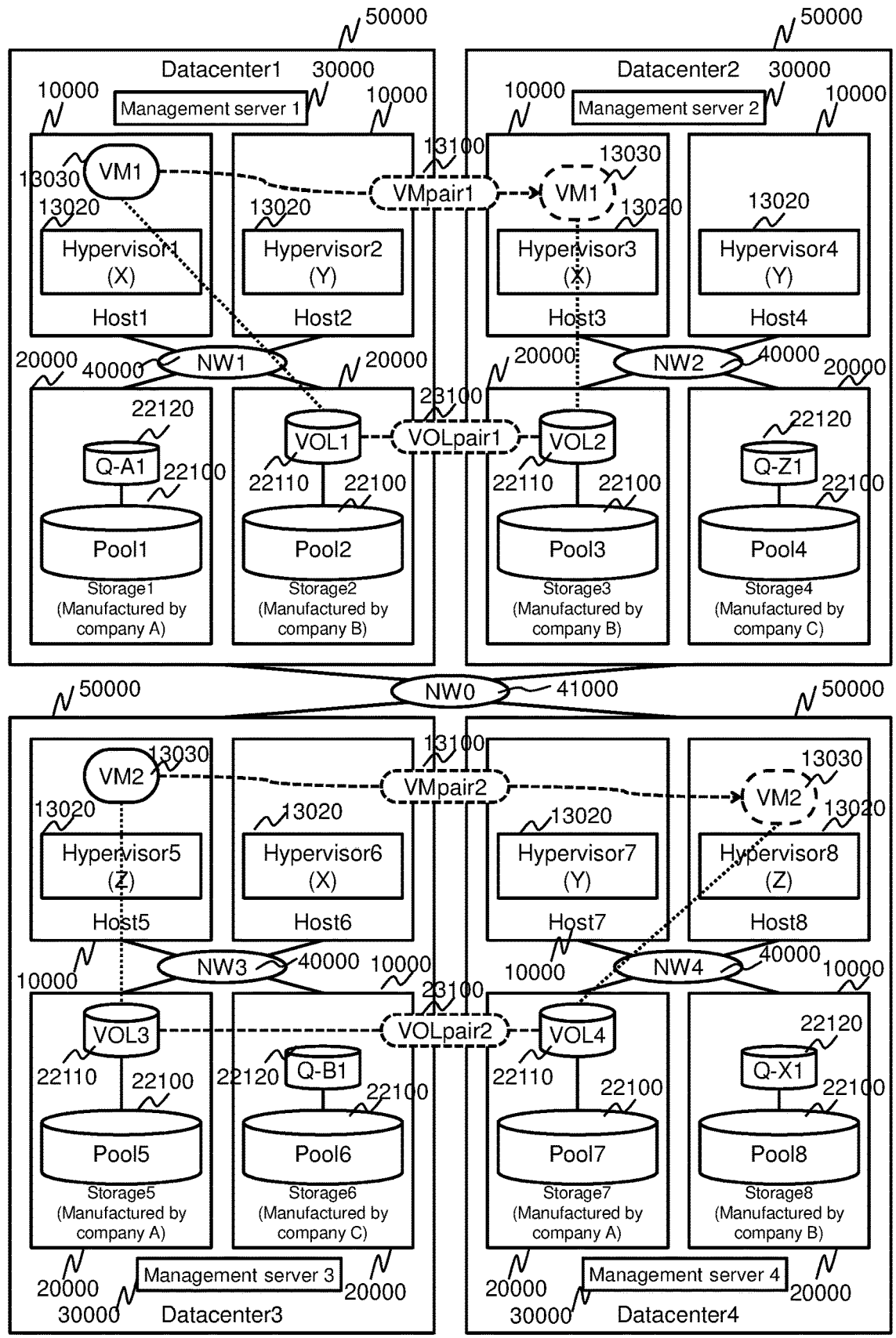
FIG. 1 is a block diagram illustrating a system configuration of Embodiment 1.

FIG. 1 is a block diagram illustrating a system configuration of Embodiment 1. A system in FIG. 1 includes data centers 50000 and a network 41000 between the data centers.

The data center 50000 includes hosts 10000, storages 20000, a management server 300000, and a network 40000 between the hosts and the storages. The management server 30000 can communicate to/from all the hosts 10000 and the storages 20000 in the data center 50000. The management server 30000 can communicate to/from the management server 30000 of another data center 50000. A network configured to couple those components to each other is not shown.

The host 10000 includes a hypervisor and a virtual machine (VM in FIG. 1). The virtual machine can form an HA pair (VM pair in FIG. 1) with a virtual machine of another host 10000. The HA pair is a pair achieving the high availability, that is, a redundant configuration pair.

The storage 20000 includes a pool providing a storage area such as a RAID Group or a Thin Provisioning Pool, and a volume that is a storage area segmented from the pool (VOL in FIG. 1). The volume can form an HA pair (VOL pair in FIG. 1) with the volume of another storage 20000. The storage 20000 includes a volume of a disk of a quorum (Quorum Disk (Witness) (Q-xx in FIG. 1)) for the HA pair of the virtual machines and the HA pair of the storages 20000.

In this Embodiment, there is described an example of constructing, after forming the HA pair of the storages, the HA pair of the hosts (servers) together with the forming of the HA pair of the storages in the creation of a virtual server in an IaaS.

Figure 2:
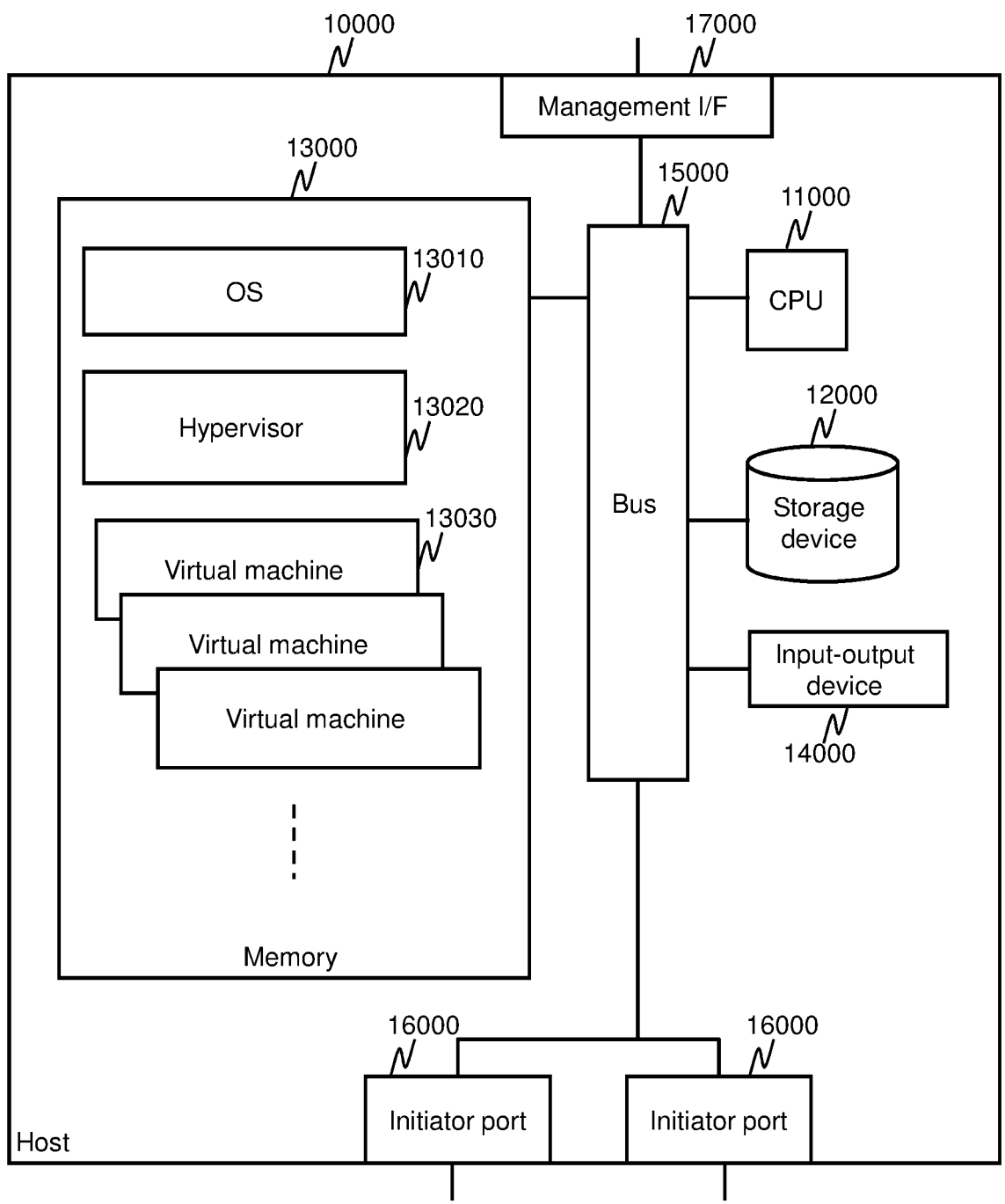
FIG. 2 is a diagram schematically illustrating a configuration example of a host 10000.

FIG. 2 is a diagram schematically illustrating a configuration example of the host 10000. The host 10000 includes a CPU (Central Processing Unit) 11000 that is a processor, a non-volatile secondary storage device 12000, a memory 13000 that is a main storage device, an input-output device 14000, initiator ports 16000 that are I/O request issuing interfaces, and a management interface 17000. Those components are communicatively connected to each other by a bus 15000.

The CPU 11000 is configured to operate by reading and executing programs stored in the memory 13000. Typically, programs and data stored in the secondary storage device 12000 are loaded to the memory 13000. In this example, the memory 13000 holds an OS (Operating System) 13100, a hypervisor 13020, and a plurality of virtual machine programs 13030.

The initiator ports 16000 are network interfaces connected to the network 40000 between the hosts and the storages or the network 41000 between the data centers. The initiator ports 16000 are configured to send and receive data and request to and from the storage 20000 via the network 40000 or 41000.

The management interface 17000 is a network interface connected to the management server 30000. The management interface 17000 is configured to send and receive management data and control commands to and from the storage 20000 via a Local Area Network (LAN) in the data center 50000 and the network 41000 between the data centers. The management interface 17000 is configured to send and receive the management data and the control commands to and from the management server 30000 via the Local Area Network (LAN) in the data center 50000 and the network 41000 between the data centers.

Figure 3:
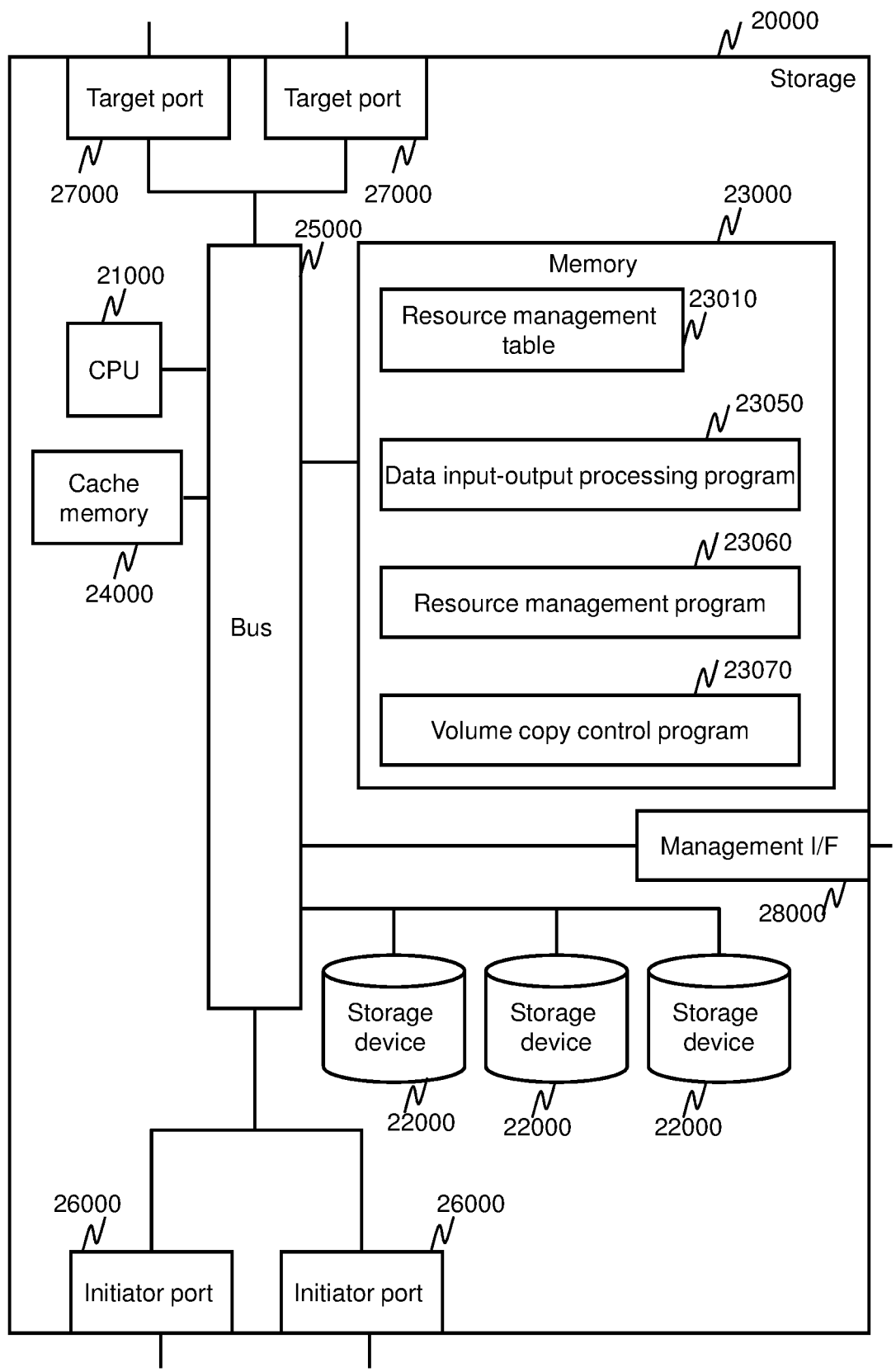
FIG. 3 is a diagram schematically illustrating a hardware configuration example of a storage 20000.

FIG. 3 is a diagram schematically illustrating a hardware configuration example of the storage 20000. In this example, the basic configurations of the storages 20000 are the same, but the number of the components, the store capacity, and the like depend on each physical storage devices. The storages 20000 may have different configurations.

The storage 20000 includes a plurality of storage devices (for example, a hard disk drive, an SSD (Solid State Drive), and the like) 22000 and a storage controller configured to control the storage 20000 and perform volume management, data communication to/from the host 10000 or other storages, and the like. The storage controller includes a CPU 21000 that is a processor, a memory 23000, initiator ports 26000 that are I/O request issuing interfaces, target ports 27000 that are I/O request receiving interfaces, a management interface 28000, and a cache memory 24000 for data transfer. The components of the storage 20000 are communicatively connected to each other by a bus 25000.

The storage 20000 can be connected to another external storage via the initiator ports 26000, to thereby send the I/O request and write data (user data) to the external physical storages via the initiator ports 26000 and receive read data (user data) from the external physical storage. The initiator ports 26000 are connected to the network 40000 between the hosts and the storages and the network 41000 between the data centers.

The initiator ports 26000 have a function of converting protocols used for communication to/from an external physical storage system such as a Fibre Channel (FC), a Fibre Channel Over Ethernet (registered trademark) (FCoE), and an iSCSI to a protocol used in the storage controller, for example, a PCIe.

The storage 20000 is connected to the host 10000 or the external storage at the target ports 27000. The storage 20000 is configured to receive the I/O request and the write data from the host 10000 or the external physical storage via the target ports 27000, and send the read data to the host 10000 or the external physical storage. The target ports 27000 are connected to the network 40000 between the hosts and the storages and the network 41000 between the data centers.

The target ports 27000 have a function of converting protocols used in the communication to/from the host 10000 or the external storage such as the FC, the FCoE, the iSCSI to a protocol used in the storage controller, for example, the PCIe.

The management interface 28000 is a device configured to couple the storage 20000 to the management server 30000. The management interface 28000 has a function of converting a protocol used in the LAN to a protocol used in the storage controller, for example, the PCIe.

The CPU 21000 is configured to execute programs for controlling the storage, to thereby achieve predetermined functions including controlling the I/O from the host 10000 and managing and controlling the volume of the storage 20000. At least part of the functions achieved by the CPU 21000 described in this Embodiment may be achieved by a logic circuit different from the CPU 21000.

The memory 23000 stores the data and the programs handled by the CPU 21000. The data in the memory 23000 is loaded to the memory 23000 from one of the storage devices 22000 or a flash memory (not shown) in the storage 20000 or another apparatus connected thereto via the network, for example.

Figure 4:
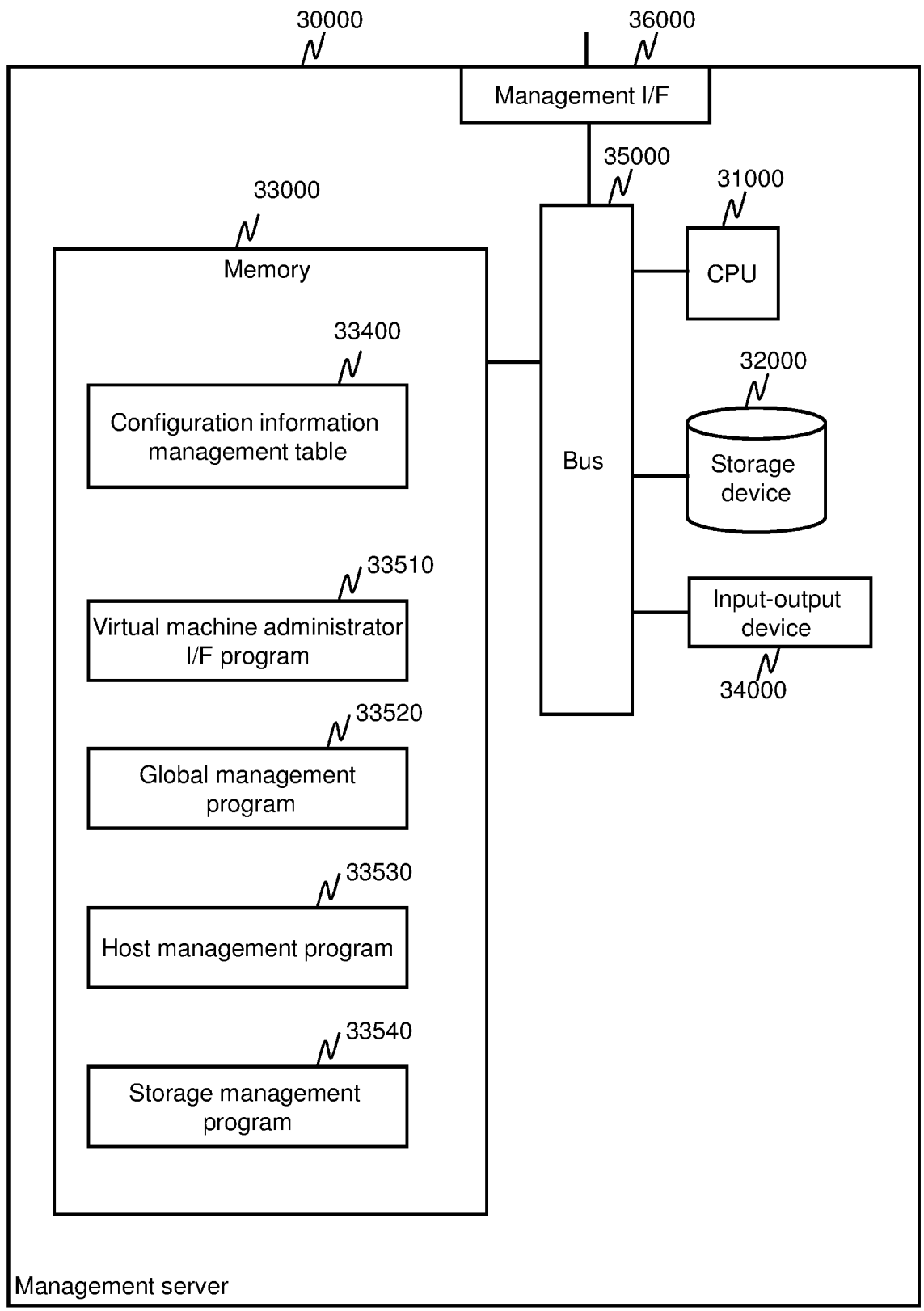
FIG. 4 is a diagram illustrating a configuration example of a management server 30000.

FIG. 4 is a diagram illustrating a configuration example of the management server 30000. The management server 30000 includes a CPU 31000 that is a processor, a memory 33000 that is a main storage device, a secondary storage device 32000, an input-output device 34000, and a management interface (I/F) 36000. The devices of the management server 30000 are communicatively connected to each other by a bus 35000.

The management server 30000 is configured to execute management programs and operate in accordance therewith. The management I/F 36000 is connected to the network in the data center or the network between the data centers, and is configured to perform conversion between the protocol in the management server 30000 and the protocol of the external network. The management server 30000 can communicate to/with the storage 20000 and the host 10000 via the management I/F 36000.

The input-output device 34000 includes one or a plurality of devices out of devices such as a display, a pointer, and a keyboard. The user can operate the management server 3000 through the input-output device 34000 and may access the management server 30000 from a client computer connected thereto via the network. The client computer is included in the management system together with the management server 30000. The user can input needed information through an input device (for example, a mouse and a keyboard) and visually recognize the needed information through an output device.

The CPU 31000 is configured to execute the programs stored in the memory 33000, to thereby achieve a predetermined function of the management server 30000. The memory 33000 stores the programs executed by the CPU 31000 and the data necessary for executing the programs. The programs configured to operate in the management server 30000 are described later. At least part of the functions achieved by the CPU 31000 described in this Embodiment may be achieved by a logic circuit different from the CPU 31000.

For example, the program is loaded to the memory 33000 from the secondary storage device 32000. The secondary storage device 32000 is a storage devices including a non-volatile non-transitory storage medium configured to store the programs and the data necessary for achieving the predetermined functions of the management server 30000. The secondary storage device 32000 may be an external storage devices connected to the management server 30000 via the network.

The management system of this configuration example is formed of the management server, but the management system may be formed of a plurality of computers. One of the plurality of computers may be a computer used for display, and the plurality of computers may achieve processing similar to the management server in order to increase speed and reliability of management processing.

For example, the manager may access the management server of the management system from a management console of the management system, instruct the processing to the management server, and cause the management console to obtain and display the processing result of the management server. The management system may be formed in the physical storage. A part of the functions of the management system may be implemented in the physical storage.

The memory 33000 of the management server 30000 is configured to store the data and the programs handled by the CPU 31000. The data in the memory 33000 is loaded to the memory 33000 from one of the storage devices 22000 or the flash memory (not shown) in the storage 20000 or another apparatus connected thereto via the network, for example.

The memory 33000 holds an OS, a virtual machine administrator I/F program 33510, an global management program 33520, a host management program 33530, and a storage management program 33540. The memory 33000 holds a configuration information management table 33400.

The virtual machine administrator I/F program 33510 is configured to provide the user an interface such as a Command Line Interface (CLI) or a Graphical User Interface (GUI) for managing the virtual machine.

The host management program 33530 is configured to manage the resources of the hosts in the data center.

The storage management program 33540 is configured to manage the resources of the storages in the data center.

The global management program 33520 is configured to manage the resources of the hosts and the storages of all the data centers. The global management program 33520 can communicate to/from the host management program and the storage management program of the management server.

The configuration information management table 33400 is a table for managing the resources of the hosts and the storages illustrated in FIG. 5 to FIG. 26. The storage management program 33540 is configured to refer to and update tables illustrated in FIG. 5 to FIG. 9. The host management program 33530 is configured to refer to and update tables illustrated in FIG. 10 to FIG. 15. The global management program 33520 is configured to refer to and update tables in FIG. 16 to FIG. 26. In the following, the tables in FIG. 5 to FIG. 26 are described.

FIG. 5 illustrates a configuration example of a storage management table 33010. The storage management table 33010 includes a storage ID column 33011 for storing the ID of the storage in the data center, and a vendor name 33012 for storing the vendor name of the hardware of the storage.

FIG. 6 illustrates a configuration example of a pool management table 33020. The pool management table 33020 includes a pool ID column 33021 for storing the pool ID of the pool of each storage in the data center, a storage ID column 33022 for storing the storage ID of the storage having the pool, an total capacity column 33023 for storing the value of the total capacity including the used amount, the free capacity, and the like of the pool, and a free capacity column 33024 for storing the value of the free capacity of the pool.

FIG. 7 is a configuration example of a volume management table 33030. The volume management table 33030 includes a VOL ID column 33031 for storing the volume ID of the volume created from the pool of each storage in the data center, a pool ID column 33032 for storing the pool ID of the pool, and a capacity column 33033 for storing the value of the capacity of the volume.

FIG. 8 illustrates a configuration example of a volume pair generatable configuration management table 33040. The volume pair generatable configuration management table 33040 includes a pool ID column 33041 for storing the pool ID of each storage in the data center, the other pool ID column 33043 for storing the pool ID of the storage in other data centers with which the volume pair configuration can be constructed, and a pair type column 33042 for storing information on the pair type.

Character strings that are "HA" for the HA pair and "DR" for a DR pair, for example, are stored in the pair type column 33042. The DR (Disaster Recovery) means recovery or repairing of the system that has received damage from natural disaster or the like. The DR may also construct the redundant configuration in the servers and the storages. The combination of the storages capable of forming the volume pair may be freely selectable according to the specifications of the storage hardware and the software and the like.

FIG. 9 illustrates a configuration example of a volume pair management table 33050. The volume pair management table 33050 includes a VOL pair ID column 33051 for storing the pair ID of the volume pair, a VOL ID 33052 for storing the volume ID of one side of the volumes of the pair or the Quorum volume in the data center, a pair type column 33053 for storing information on the pair type of the pair, a VOL type column 33054 for storing information on the volume type of the volume associated with the pair, a pair state column 33055 for storing information on the pair state of the pair, the other VOL ID column 33056 for storing the volume ID of one side of the volumes of the pair in another data center, a Quorum ID column 33057 for storing the volume ID of the Quorum volume of the pair, and a Grp ID column 33058 for storing the group ID of a consistency group and the like to which the pair belongs.

The consistency group is formed of at least one volume pair, and each volume pair includes a primary volume and a secondary volume. The primary volume is a logical volume provided to a higher-level apparatus and provides a write access. The secondary volume is a logical volume that is duplication of the primary volume. The consistency group is a volume group in which consistency between one or more primary volumes and one or more secondary volumes needs to be established. The consistency group is prepared in a disk apparatus.

Character strings that are "PVOL" for the Primary Volume (PVOL), "SVOL" for the Secondary Volume (SVOL), and "Quorum" for the Quorum volume, for example, are stored in the VOL type column. Character strings that are "COPY" when data is being copied between the pair of volumes, "PAIR" when the copying of the data is completed and the data is being synchronized, and "PSUS" (PAIR SUSPEND) when the copying of the data is suspended, for example, are stored in the pair state column 33055.

FIG. 10 illustrates a configuration example of a host management table 33110. The host management table 33110 includes the host ID column 33111 for storing the host ID of each host in the data center.

FIG. 11 illustrates a configuration example of a hypervisor management table 33120. The hypervisor management table 33120 includes a hypervisor ID column 33121 for storing the hypervisor ID of a hypervisor in each host in the data center, a hypervisor name column 33122 for storing character strings indicating the type of the hypervisor, and a host ID 33123 of the host having the hypervisor.

FIG. 12 illustrates a configuration example of a virtual machine management table 33130. The virtual machine management table 33130 includes a VMID column 33131 for storing the ID of the virtual machine deployed in the hypervisor of the data center, a hypervisor ID column 33132 for storing the hypervisor ID of the hypervisor in which the virtual machine is deployed, and a couple VOL ID 33133 for storing the ID of the volume accessible by the VM.

FIG. 13 illustrates a configuration example of a virtual machine pair generatable configuration management table 33140. The virtual machine pair generatable configuration management table 33140 includes a hypervisor ID column 33141 for storing the ID of the hypervisor in the data center, the other hypervisor ID column 33141 for storing the ID of the hypervisor in another data center with which a pair of HA, DR, or the like can be formed, and a pair type column 33142 column of the pair.

FIG. 14 illustrates a configuration example of a virtual machine pair management table 33150. The virtual machine pair management table 33150 includes a VM pair ID column 33151 for storing the ID of the pair of which components are the virtual machines in the data center, a VMID column 33152 for storing the ID of the virtual machine in the data center of that pair, a pair type column 33153 for storing character strings indicating information on the pair type, a VM state column 33155 for storing character strings indicating information on the state of the virtual machine having the ID of the VMID column 33152, the other hypervisor ID column 33156 for storing the ID of the hypervisor that is one side of the pair in another data center, and a Quorum ID column 33157 for storing the ID of the Quorum volume of that pair.

Character strings that are "Active" when the virtual machine is in the operating state (Active) and is "Standby" when the virtual machine is in the waiting state (Standby), for example, are stored in the VM state column.

FIG. 15 illustrates a configuration example of a storage-host couplable configuration management table 33160. The storage-host couplable configuration management table 33160 includes a storage ID column 33161 for storing the ID of the storage in the data center and a host ID 33162 for storing the ID of the host connected to the storage by any network and capable of communicating to/from the storage.

FIG. 16 illustrates a configuration example of an all storage management table 33210. The all storage management table 33210 includes a storage ID column 33211 for storing the IDs of the storages in all the data centers, a vendor name column 33212 for storing the storage hardware vendor name of the storage, and a data center ID column 33213 for storing the ID of the data center including the storage.

FIG. 17 illustrates a configuration example of an all pool management table 33220. The all pool management table 33220 includes a pool ID 33221 for storing the IDs of the pools in all the data centers, a storage ID column 33222 indicating the ID of the storage having the pool, an total capacity column 33223 for storing the value of the total capacity including the used amount, the free capacity, and the like of the pool, and a free capacity column 33224 for storing the value of the free capacity of the pool.

FIG. 18 illustrates a configuration example of an all volume management table 33230. The all volume management table 33230 includes a VOL ID column 3321 for storing the IDs of the volumes in all the data centers, a pool ID 33232 for storing the ID of the pool allocating the capacity to the volume, a storage ID column 33233 for storing the ID of the storage including the pool, and a capacity column 33234 for storing the value of the capacity of the volume.

FIG. 19 illustrates a configuration example of an all volume pair generatable configuration management table 33240. The all volume pair generatable configuration management table 33240 includes, for all the data centers, a first pool ID column 33241 for storing the ID of a first pool providing the volume with which a pair can be formed, a second pool ID 33242 for storing the ID of a second pool, and 33243 for storing character strings indicating information on the pair type.

FIG. 20 illustrates a configuration example of an all volume pair management table 33250. The all volume pair management table 33250 includes a VOL pair ID column 33251 for storing the IDs of the pairs of the volumes in all the data centers, a pair type column 33252 for storing character strings indicating information on the pair type of the pair, a pair state column 33253 for storing character strings indicating information on the pair state of the pair, a PVOL ID column 33254 for storing the ID of the PVOL of the pair, a SVOL ID column 33255 for storing the ID of the SVOL of the pair, a Quorum ID column 33256 for storing the ID of the Quorum volume of the pair, and a Grp ID column 22357 indicating the ID of a group such as the consistency group of the pair.

FIG. 21 illustrates a configuration example of an all host management table 33260. The all host management table 33260 includes a host ID 3261 for storing the IDs of the hosts in all the data centers, and a data center ID column 33262 for storing the ID of the data center including the host.

FIG. 22 illustrates a configuration example of an all hypervisor management table 33270. The all hypervisor management table 33270 includes a hypervisor ID column 33271 for storing the IDs of the hypervisors in all the data centers, a hypervisor name column 33272 for storing character strings indicating the type of the hypervisor, and a host ID column 33273 for storing the ID of the host including the hypervisor.

FIG. 23 illustrates a configuration example of an all virtual machine management table 33280. The all virtual machine management table 33280 includes a VMID column 33281 for storing the IDs of the virtual machines in all the data centers, a hypervisor ID column 33282 for storing the ID of the hypervisor including the virtual machine, and a connected VOL ID column 33283 indicating the ID of the volume accessible by the virtual machine.

FIG. 24 illustrates a configuration example of an all virtual machine pair generatable configuration management table 33290. The all virtual machine pair generatable configuration management table 33290 includes, for all the data centers, a first hypervisor ID column 33291 for storing of the ID of a first hypervisor providing the virtual machine with which a pair can be formed, a second hypervisor ID column 33292 for storing the ID of a second hypervisor, and a pair type column 33293 for storing character strings indicating information on the pair type of the pair.

FIG. 25 illustrates a configuration example of an all virtual machine pair management table 33300. The all virtual machine pair management table 33300 includes a VM pair ID column 33301 for storing the IDs of the pairs of the virtual machines in all the data centers, a pair type column 33302 for storing character strings indicating the pair type of the pair, a pair state column 33303 for storing character strings indicating the pair state of the pair, a first VMID 33304 for storing the ID of a first virtual machine of the pair, a first VM state column 33305 for storing character strings indicating the state of the first virtual machines, a second VMID 33306 for storing the ID of a second virtual machines, a second VM state column 33307 for storing character strings indicating the state of the second virtual machine, and a Quorum ID column 33308 for storing the ID of the Quorum volume of the pair.

FIG. 26 illustrates a configuration example of an all storage-host couplable configuration management table 33310. The all storage-host couplable configuration management table 33310 includes a storage ID column 33311 for storing the IDs of the storages in all the data centers, and a host ID column 33312 for storing the ID of the host connected to the storage by the network and capable of communicating to/from the storage.

Figure 27:
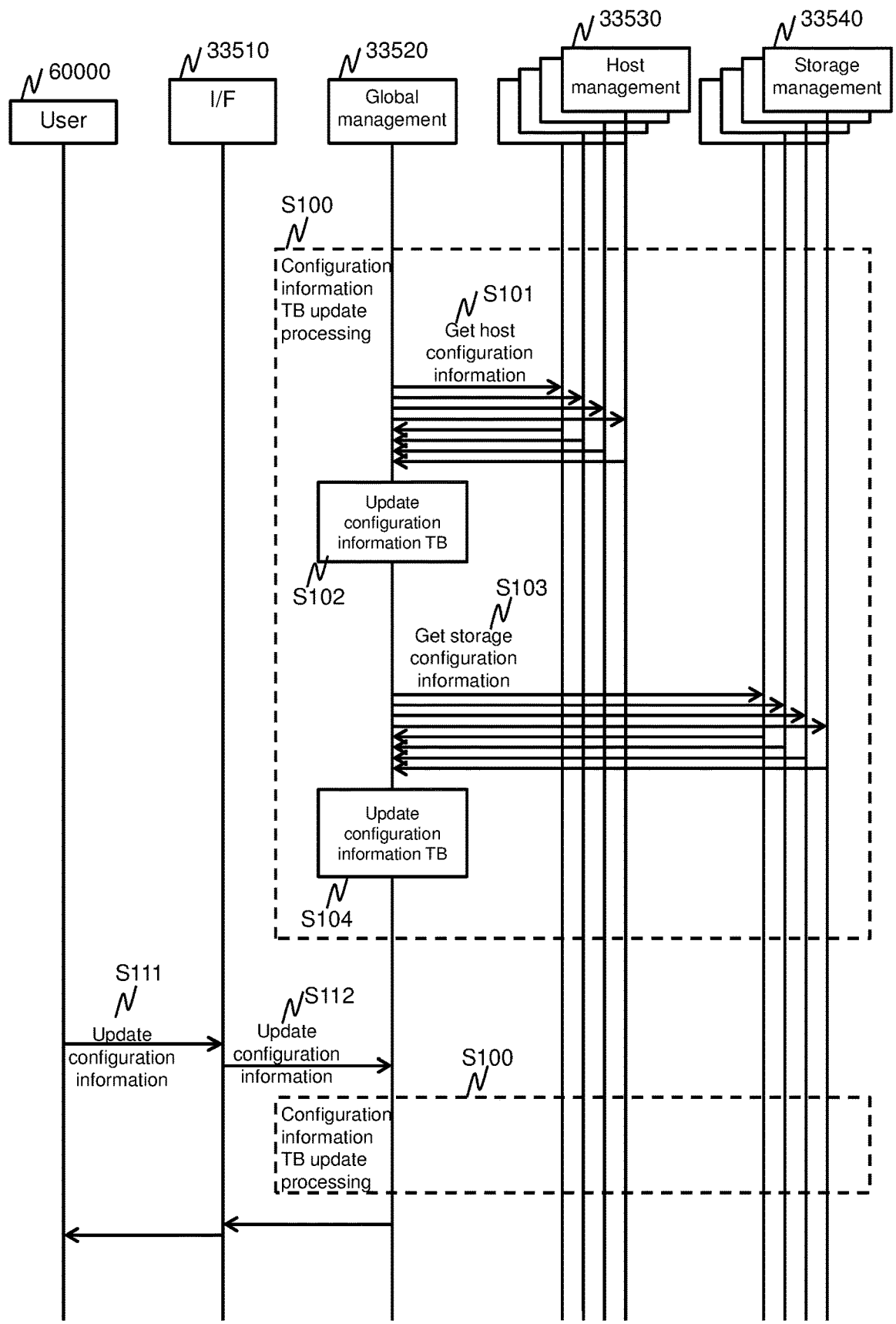
FIG. 27 is a sequence illustrating processing of getting the configuration information in FIG. 5 to FIG. 15 from all host management programs 33530 and storage management programs 33540, to update contents of the configuration information tables in FIG. 16 to FIG. 26 by an global management program 33520.
Figure 28:
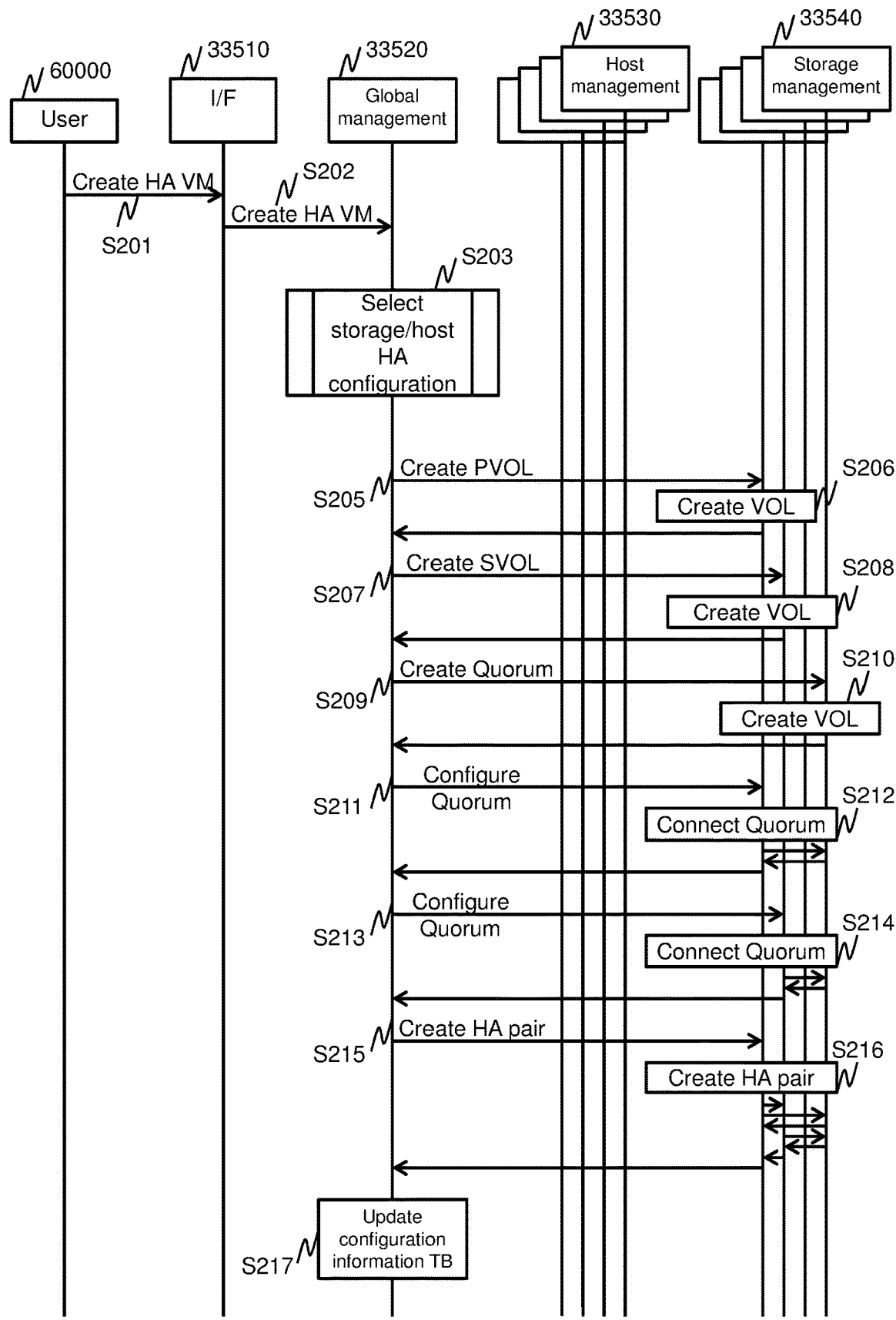
FIG. 28 is a sequence of a virtual machine generating processing to which an HA function of the host and the storage is applied.
Figure 29:
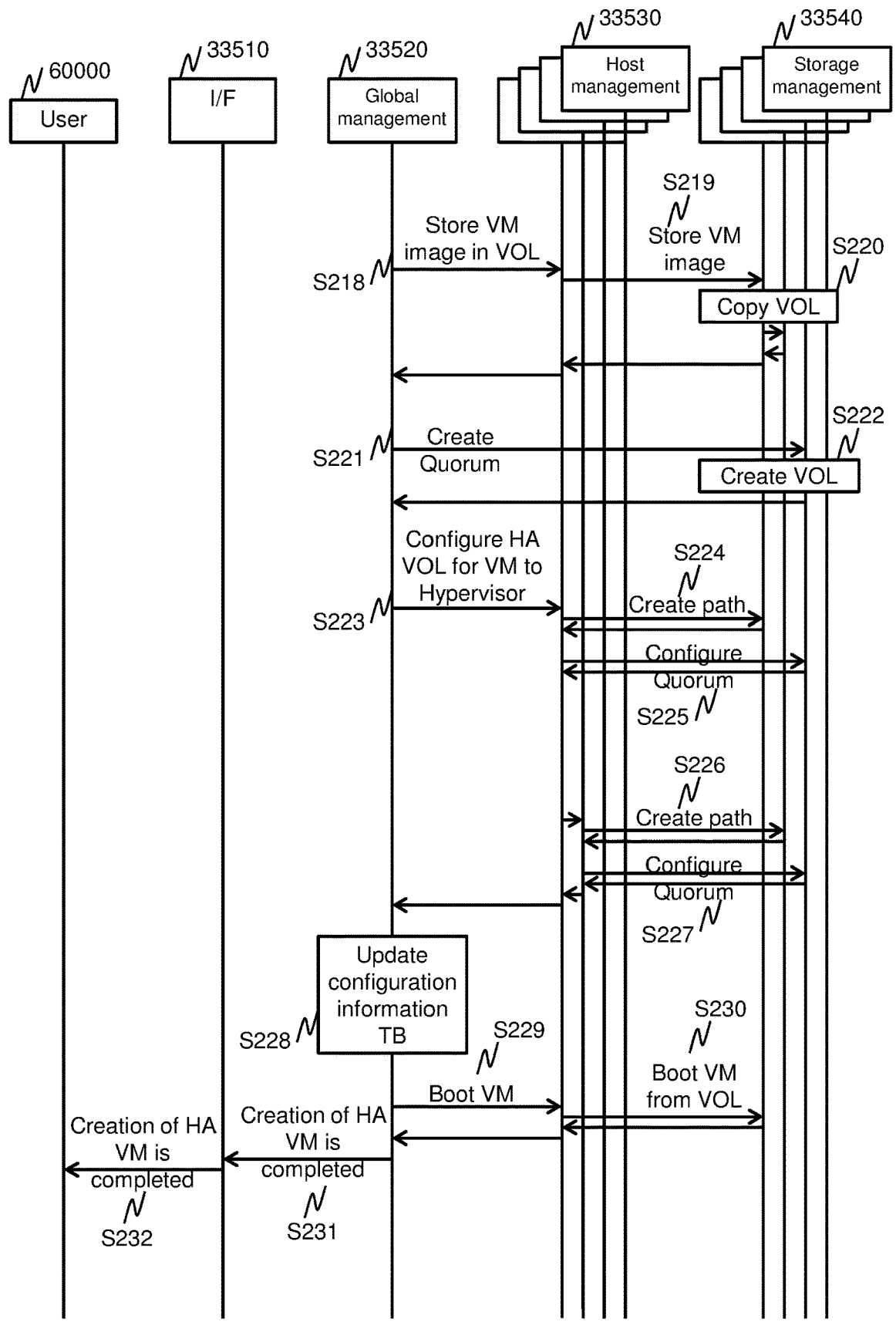
FIG. 29 is a sequence of the virtual machine generating processing to which the HA function of the host and the storage is applied.

A sequence of virtual machine generating processing of Embodiment 1 is illustrated in FIG. 27, FIG. 28, and FIG. 29. This sequence includes a user 60000, the virtual machine management user I/F program 33510, the global management program 33520, the host management programs 33530, and the storage management programs 33540. In this Embodiment, one user 60000 performs virtual machine generating operation via one virtual machine management user I/F program 33510 of one management server. One global management program 33520 of the same management server 30000 issues a command to get the configuration information of each host and each storage, a command to create the HA pair of the volumes, and a command to configure the HA pair of the virtual machines, and the like to the host management program 33530 and the storage management program 33540 of the same management server 30000, and the host management program 33530 and the storage management program 33540 of the management server 30000 in another data center 50000.

FIG. 27 is a sequence diagram illustrating processing of getting the configuration information in FIG. 5 to FIG. 15 from all the host management programs 33530 and the storage management programs 33540, to update the contents of the configuration information tables in FIG. 16 to FIG. 26 by the global management program 33520.

In Step S101, the global management program 33520 sends a command to get the host configuration information in the tables illustrated in FIG. 10 to FIG. 15 to all the host management programs 33530. When the host management programs 33530 receive the configuration information getting command from the global management program 33520, the host management program 33530 send the contents of the host configuration information in the tables illustrated in FIG. 10 to FIG. 15 to the global management program 33520.

Next, in Step S102, the global management program 33520 reflects the configuration information received from the host management programs 33530 in the tables in FIG. 16 to FIG. 26.

In Step S103, the global management program 33520 sends a command to get the storage configuration information in the tables illustrated in FIG. 10 to FIG. 15 to all the storage management programs 33540. When the storage management programs 33540 receive the configuration information getting command from the global management program 33520, the storage management programs 33540 send the contents of the storage configuration information in the tables illustrated in FIG. 5 to FIG. 9 to the global management program.

Next, in Step S104, the global management program 33520 reflects the configuration information received from the storage management programs 33540 in the tables in FIG. 16 to FIG. 26.

The series of processing of from Step S101 to S104 boxed by the broken line in FIG. 27 is herein referred to as Step S100. As in Step S111 and Step S112, the getting of the configuration information of Step S100 may be executed under the instruction of the user 60000.

FIG. 28 and FIG. 29 are the sequence of the virtual machine generating processing to which an HA function of the host and the storage is applied.

The user 60000 in FIG. 28 and FIG. 29 is an IaaS user who places a request to create, delete, and the like of the virtual machine to the global management program 33520. The I/F 33510 in FIG. 28 and FIG. 29 indicates the virtual machine management user I/F program 33510. The user 60000 issues the command to the global management program 33520 via the I/F 33510. The global management 33520 in FIG. 28 and FIG. 29 indicates the global management program 33520 in the same management server as the I/F 33510. The host management 33530 in FIG. 28 and FIG. 29 indicates the host management program 33530 in the management server of each data center. The storage management 33540 in FIG. 28 and FIG. 29 indicates the storage management program 33540 in the management server of each data center.

In Step S201 in FIG. 28, the user 60000 commands the virtual machine management user I/F program 33510 to create the virtual machine to which the HA function is applied.

Next, in Step S202, the virtual machine management user I/F program 33510 sends a command to create the virtual machine to which the HA function is applied to the global management program 33520.

Next, in Step S203, the global management program 33520 determines the storage HA configuration and the host HA configuration. Details of the step are described later.

Next, in Step S205 to Step S215, the global management program 33520 instructs the plurality of storage management programs 33540 to create the HA volume pair on the basis of the storage HA configuration and the host HA configuration determined in Step S203.

First, in Step S205, the global management program 33520 sends a command to create the primary volume (Primary Volume, PVOL) the HA to the storage management program 33540.

Next, in Step S206, the storage management program 33540 creates the volume in accordance with the command from the storage management program, and returns the completion of the command to the global management program.

Next, in Step S207, the global management program sends a command to create the secondary volume (Secondary Volume, SVOL) of the HA to the storage management program 33540.

Next, in Step S208, the storage management program 33540 creates the volume in accordance with the command from the global management program 33520, and returns the completion of the command to the storage management program 33540.

Next, in Step S209, the global management program 33520 sends a command to create the volume for the Quorum of the HA to the storage management program 33540.

Next, in Step S210, the storage management program 33540 creates the volume in accordance with the command from the storage management program 33540, and returns the completion of the command to the global management program 33520.

Next, in Step S211, the global management program 33520 sends a command to couple the PVOL and the Quorum to each other to the storage management program 33540 on the PVOL side.

Next, in Step S212, the storage management program 33540 on the PVOL side executes the configuration of the coupling between the PVOL and the Quorum for the storage management program 33540 on the Quorum side, and returns the completion of the configuration to the global management program 33520.

Next, in Step S213, the global management program 33520 sends a command to couple the SVOL and the Quorum to each other to the storage management program 33540 on the SVOL side.

Next, in Step S214, the storage management program 33540 on the SVOL side executes the configuration of the coupling between the SVOL and the Quorum for the storage management program 33540 on the Quorum side, and returns the completion of the configuration to the global management program 33520.

Next, in Step S215, the global management program 33520 sends a command to create the HA pair between the PVOL and the SVOL to the storage management program 33540 on the PVOL side.

Next, in Step S216, the storage management program 33540 on the PVOL side executes the creation of the HA pair between the PVOL and the SVOL for the storage management program 33540 on the SVOL side, and returns the completion of the creation of the pair to the global management program 33520.

Next, in Step S217, the global management program 33520 reflects the information on the configuration after the creation of the HA volume pair described above in the configuration management table. At this time, the global management program 33520 may perform the configuration information TB update processing of Step S100 again.

Next, in Step S218 in FIG. 29, the global management program 33520 sends a command to store a VM image in the PVOL to the host management program 33530.

Next, in Step S219, the host management program 33530 sends a command to write the VM image data to the PVOL to the storage management program 33540 on the PVOL side in accordance with the command from the global management program 33520.

Next, in Step S220, the storage management program 33540 copies the data written in the PVOL to the SVOL side.

Next, in Step S221, the global management program 33520 sends a command to create the volume for the Quorum to the storage management program 33540 of the storage configured to create the Quorum of the host HA.

Next, in Step S222, the storage management program 33540 creates the volume, and returns the completion of the command to the global management program 33520.

Next, in Step S223, for each hypervisor in the host HA configuration determined in Step S204, a path from the storage HA pair volume is created and the Quorum of the host HA is configured.

First, in Step S224, the host management program 33530 instructs the storage management program 33540 on the PVOL side to create a path from the PVOL to the host.

Next, in Step S225, the host management program 33530 configures the Quorum for the storage management program 33540 on the Quorum side of the host HA.

Next, in Step S226, the host management program 33530 instructs the host management program 33530 of another host of the host HA pair to create a path from the storage HA pair volume (Step S226), and configure the Quorum of the host HA (Step S227).

Next, in Step S228, the global management program 33520 reflects the information on the configuration gotten after the creation of the HA volume pair described above in the configuration management table. At this time, the global management program 33520 may perform the configuration information TB update processing of Step S100 again.

Next, in Step S229, the global management program 33520 instructs the host management program 33530 to boot the virtual machine.

Next, in Step S230, the host management program 33530 accesses the volume (Step S230) and boots the virtual machine.

Next, in Step S231, the host management program 33530 returns the completion of the boot of the virtual machine to the global management program 33520.

Next, in Step S231, the global management program 33520 returns the completion of the creation of the virtual machine to the virtual machine management user I/F program 33510.

Next, the virtual machine management user I/F program 33510 notifies the user 60000 of the completion of the creation of the virtual machine.

Figure 30:
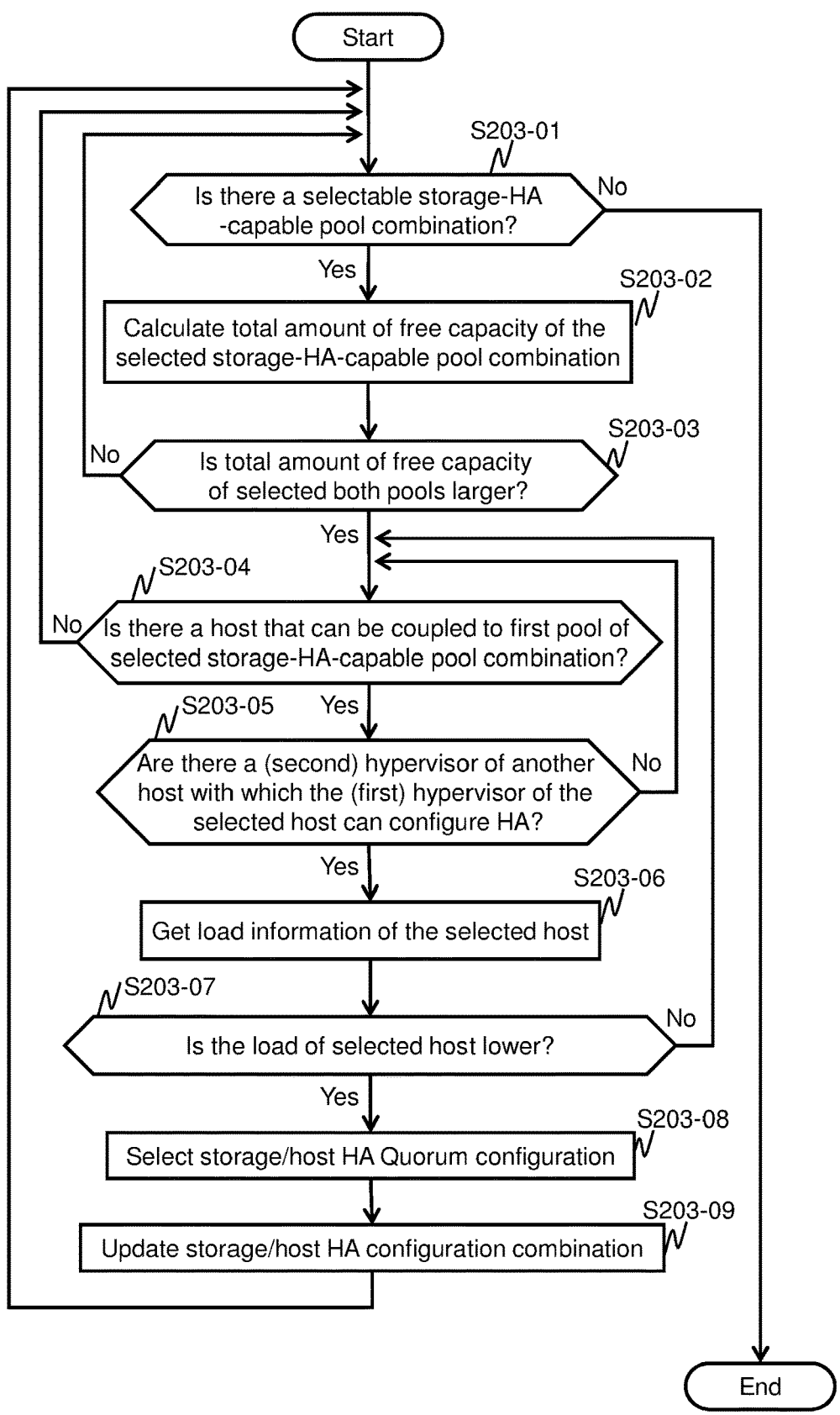
FIG. 30 is a flowchart of processing of determining a storage HA configuration and a host HA configuration.

FIG. 30 is a flowchart of processing of determining the storage HA configuration and the host HA configuration.

First, in Step S203-01, the global management program 33520 refers to the all volume pair generatable configuration management table 33240, and selects one pool combination of the storage with which the HA volume pair can be created, to thereby proceed to Step S203-02. When there are no unselected pool combinations, the processing is ended. When any one of the storage HA configuration and the host HA configuration is undetermined, the processing is ended abnormally.

Next, in Step S203-02, the global management program 33520 refers to the all pool management table 33220, and calculates the total value of the free capacity of both pools of the pool combination selected in the previous Step S203-01.

Next, in Step S203-03, the global management program 33520 proceeds to Step S203-04 when the total value of the free capacity of both the pools of the pool combination selected in the previous Step S203-01 is larger than that of the pool combination of the storage HA that is already determined, and returns to Step S203-01 if not.

The method of selecting the pool combination is not limited to the method in this Embodiment and other methods may be used.

Next, in Step S203-04, the global management program 33520 refers to the all storage-host couplable configuration management table. When there is one unselected host that can be connected to one storage of the pool combination selected in the previous Step S203-01, the global management program 33520 selects the host to proceed to Step S203-05, and returns to Step S203-01 if there is none.

Next, in Step S203-05, the global management program 33520 refers to the all virtual machine pair generatable configuration management table 33290. When there is an unselected one out of the combinations of the (first) hypervisors of the hosts selected in the previous Step S203-04 and the hypervisors (second) capable of forming the HA, the global management program 33520 selects the unselected one to proceed to Step S203-06, and returns to Step S203-04 if there is none.

Next, in Step S203-06, the global management program 33520 gets the calculation processing load information such as the CPU use rate or the memory use rate of the selected host.

Next, in Step S203-07, the global management program 33520 refers to the load information gotten in the previous Step S203-06. When the load of the host selected in the previous Step S203-04 is lower than that of a first host of the host HA that is already determined, the processing proceeds to Step S203-08, and returns to Step S203-04 if not. The method of selecting the host is not limited to the method in this Embodiment and other methods may be used.

Next, in Step S203-08, the global management program 33520 refers to the all pool management table 33220, and selects the pool of the storage for generating the volume for the Quorum of the storage HA and the pool of the storage for generating the volume for the Quorum of the host HA. In order to maintain the availability, the pool for generating the volume is selected to be the pools having the largest free capacity among pools other than the two pools generating the HA volume pair, and among pools in a place different from the data center including the host in which the HA host pair is placed. The method of selecting the pool is not limited to the method in this Embodiment and other methods may be used.

Next, in Step S203-09, the global management program 33520 updates the combination information of the storage HA configuration and the host HA configuration determined in the previous Step S203-01 to Step S203-09 and returns to Step S203-01.

In this Embodiment, the management computer (management server 30000) is a computer configured to manage the resources of the computer system in which the server resource and the storage resource are combined and allocated to the virtual machine. The computer system includes the plurality of server resources and the plurality of storage resources, and the management computer combines the server resource and the storage resource out of the plurality of server resources and the plurality of storage resources, to thereby allocate the combination to the virtual machine.

The configuration information management table 33400 is stored in the memory 33000 of the management server 30000. The configuration information management table 33400 includes storage management information (storage management table 33010) for allowing determination as to whether a redundant configuration pair can be formed for the plurality of storage resources, and also includes couplable configuration management information (storage-host couplable configuration management table 33161) for allowing determination as to whether the plurality of storage resources and the plurality of server resources can be connected to each other.

The storage ID 33011 of each storage and the vendor name 33012 of the vendor of the storage are associated with each other and recorded in the storage management table 33010. Here, the storages of the same vendor can be connected to each other. The storage ID of each storage and the host ID 33162 of the host that can be connected to the storage are associated with each other and recorded in the storage-host couplable configuration management table 33160.

When the CPU 31000 deploys the virtual machine, the CPU 31000 first determines the storage resources to be paired in a redundant configuration by reference to the storage management information and. Next, the CPU 31000 selects, by reference to the couplable configuration management information, the server resources that can be connected to the storage resources to be paired in a redundant configuration, to thereby pair the server resources in a redundant configuration.

As a result, the redundant configuration in which the server and the storage are associated with each other can be efficiently constructed by first determining the redundant configuration of the storage in which restrictions are often imposed on the redundant configuration and determining the redundant configuration of the server next because there are generally more restrictions on the storage than on the server in the creation of the redundant configuration pair.

The CPU 31000 allocates the storage resources to be paired in a redundant configuration to the primary storage and the secondary storage of the redundant configuration, and causes an apparatus other than the primary storage and the secondary storage to store storage quorum information for enabling the primary storage and the secondary storage to confirm the existence of each other. The CPU 31000 allocates the server resources to be paired in a redundant configuration to the primary server and the secondary server of the redundant configuration, and causes an apparatus other than the primary server and the secondary server to store server quorum information for enabling the primary storage and the secondary storage to confirm the existence of each other. As a result, information on the quorum can be placed in a third site different from the primary and the secondary.

The CPU 31000 may be able to cause the server quorum information and the storage quorum information to be stored in the same apparatus. As a result, the quorum information of the server and the storage can be stored in the same apparatus, and hence the quorum information can be placed efficiently.

The plurality of server apparatuses and the plurality of storage apparatuses may be distributed among a plurality of sites that do not simultaneously malfunction due to the same accident. In that case, it is preferred that the CPU 31000 configure the server resources to be paired in a redundant configuration and an apparatus configured to store the server quorum information to be in mutually different sites. The CPU 31000 configures the storage resources to be paired in a redundant configuration and an apparatus configured to store the storage quorum information to be in mutually different sites. As a result, the redundant configuration pair and the apparatus configured to store the quorum information can be placed in sites that do not malfunction at the same time due to an accident, thereby ensuring the high reliability of the system.

When there are a plurality of pairs of the storage resources of the redundant configuration, it is preferred that the CPU 31000 configure a consistency group which includes the plurality of pairs of storage resources and in which consistency among all the pairs is established. As a result, the pairs of the storage resources can be managed as the consistency group, and it is possible to efficiently ensure the consistency and deploy the virtual machine.

In this Embodiment, an example of defining the pairs of the storages of the redundant configuration first and defining the pairs of the servers of the redundant configuration next is described, but other configurations are also possible. It is sufficient that the pair on which a greater restriction is imposed out of two resources be determined first when the pairs of the redundant configuration are determined.

For example, when the computer system includes a plurality of first resources and a plurality of second resources exemplified by the servers and the storages, and the first resources and the second resources are combined and allocated to the virtual machine, the management apparatus selects, when selecting the redundant configuration pair for the first resources and the second resources, a pair for the resources having a lower proportion of selectable combinations of pairs in the plurality thereof first. As a result, the redundant configuration in which the first resources and the second resources are associated with each other can be constructed efficiently because the resource in which a greater restriction is imposed on the redundant configuration pair is determined first and the redundant configuration pair of the other resource is determined next. Here, the one having a lower proportion of selectable combinations of pairs is the one on which a greater restriction is imposed in the determination of the pair.

Embodiment 2

Embodiment 2 is an example of constructing, after forming a storage DR (Disaster Recovery), a host DR configuration together with the formation of the storage DR in the creation of the virtual server in the IaaS. In the HA in Embodiment 1, the Quorum is configured besides the primary and the secondary. However, in the DR in Embodiment 2, only the primary and the secondary are configured and the Quorum is not configured.

Figure 31:
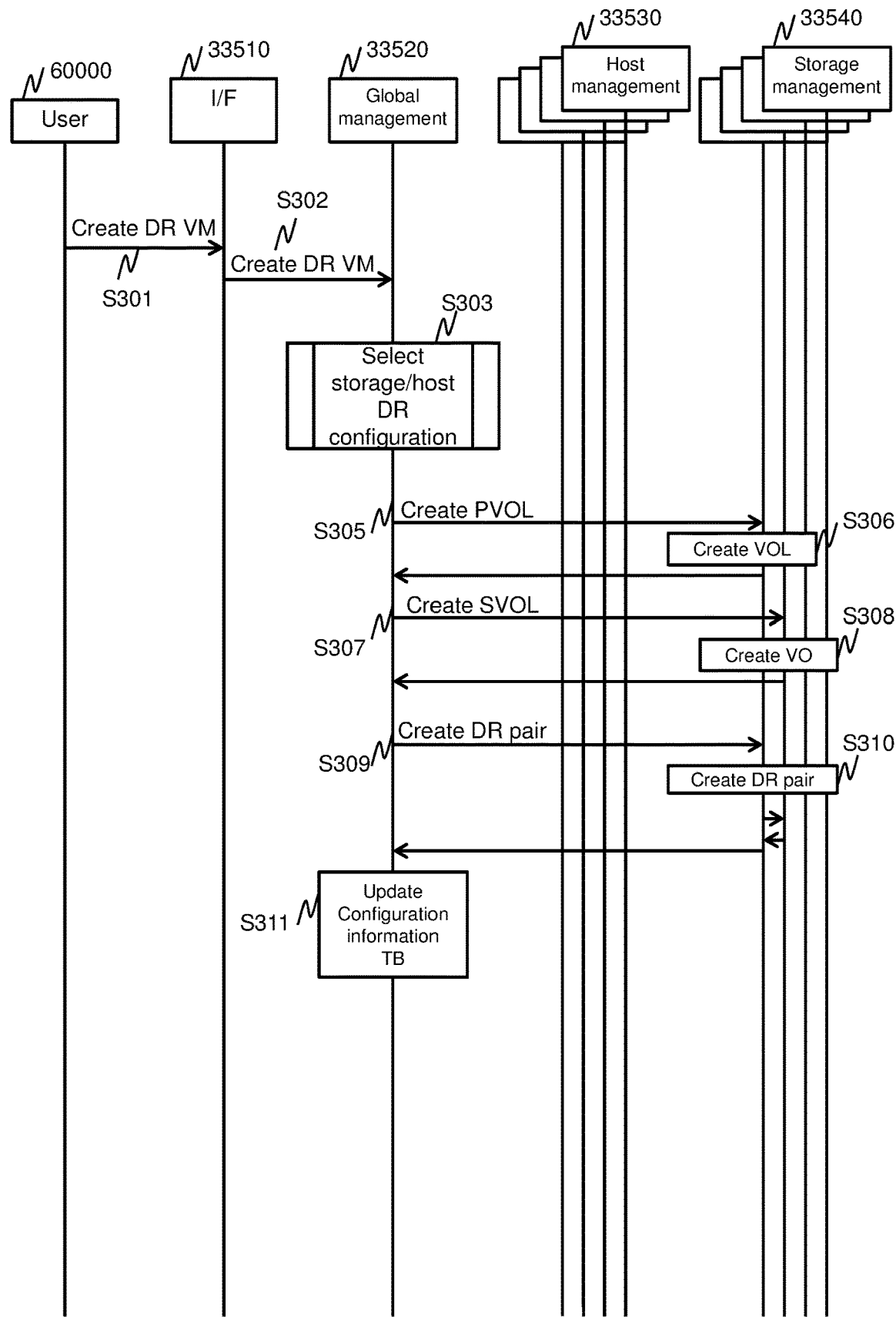
FIG. 31 is a sequence of the virtual machine generating processing to which a DR function of the host and the storage is applied.
Figure 32:
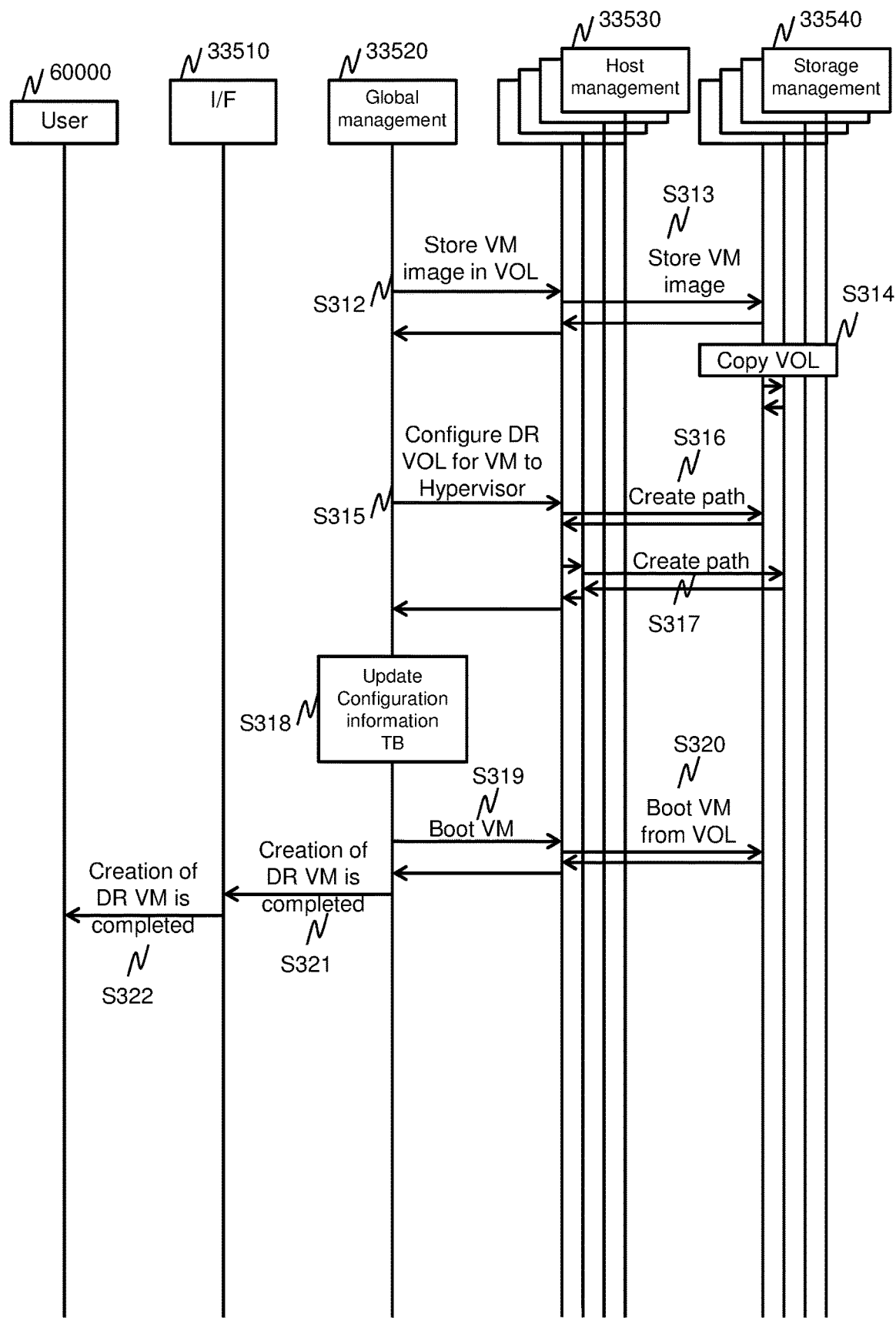
FIG. 32 is a continuation of the sequence of FIG. 31 of the virtual machine generating processing to which the DR function of the host and the storage is applied.

FIG. 31 and FIG. 32 are a sequence of the virtual machine generating processing to which the DR function of the host and the storage is applied. FIG. 31 corresponds to FIG. 28 in Embodiment 1, and FIG. 32 corresponds FIG. 29 in Embodiment 1. The sequence of FIG. 31 and FIG. 32 is different from the sequence of FIG. 28 and FIG. 29 in that the sequence of FIG. 31 and FIG. 32 has no Quorum configuration.

Figure 33:
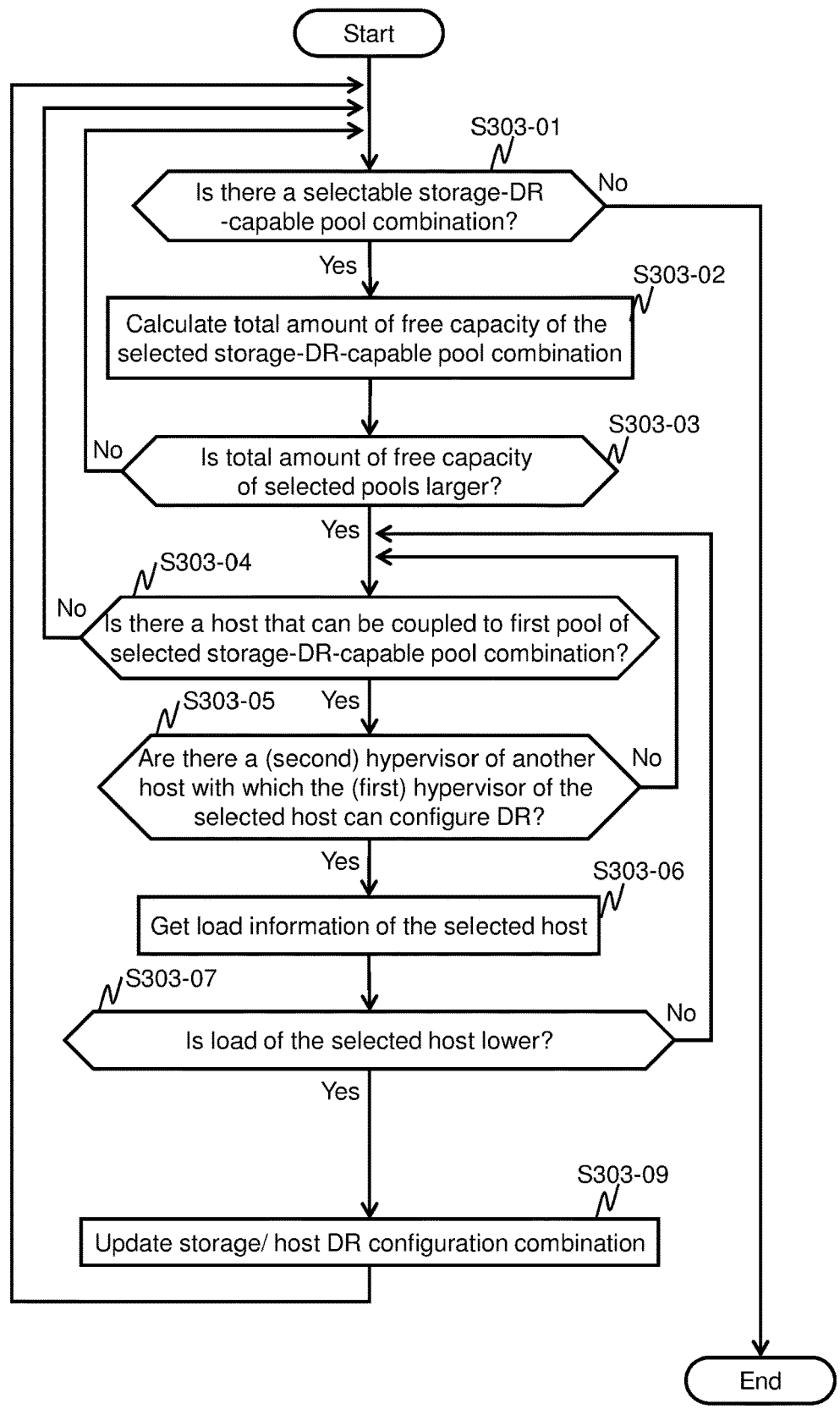

FIG. 33 is a flowchart illustrating processing of determining the storage DR configuration and the host DR configuration. FIG. 33 corresponds to FIG. 30 in Embodiment 1. The flowchart in FIG. 33 is different from FIG. 30 only in that the flowchart in FIG. 33 has no Quorum configuration.

According to this Embodiment, it is possible to efficiently construct the redundant configuration to which the server and the storage are associated with each other also in the DR function as in the HA function in Embodiment 1.

Embodiment 3

Embodiment 3 is an example of coupling another volume to the virtual machine to which the HA is applied that is already created in the creation of the virtual server in the IaaS.

Figure 34:
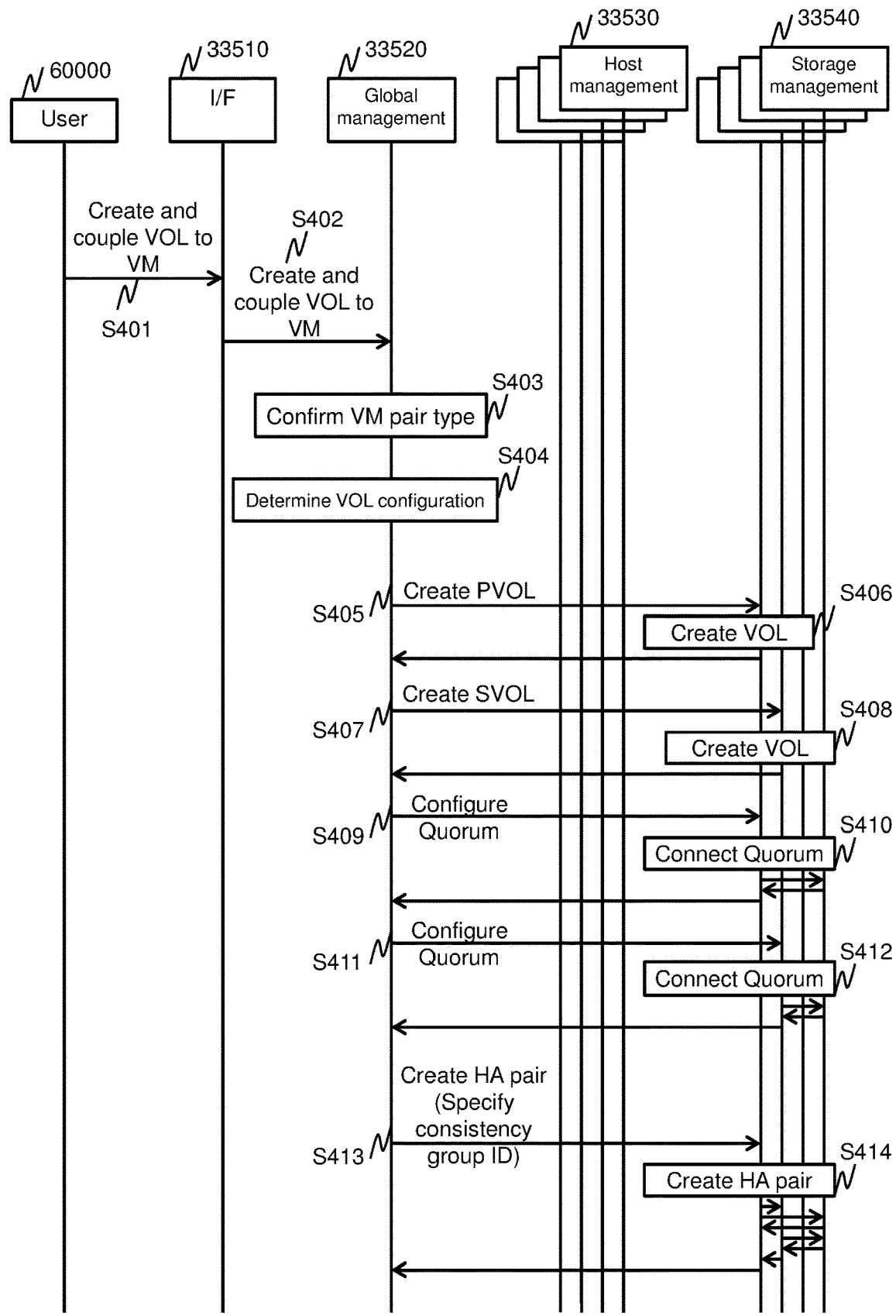
FIG. 34 is a sequence illustrating processing of coupling a volume to the virtual machine to which the HA configuration is applied to the host and the storage.
Figure 35:
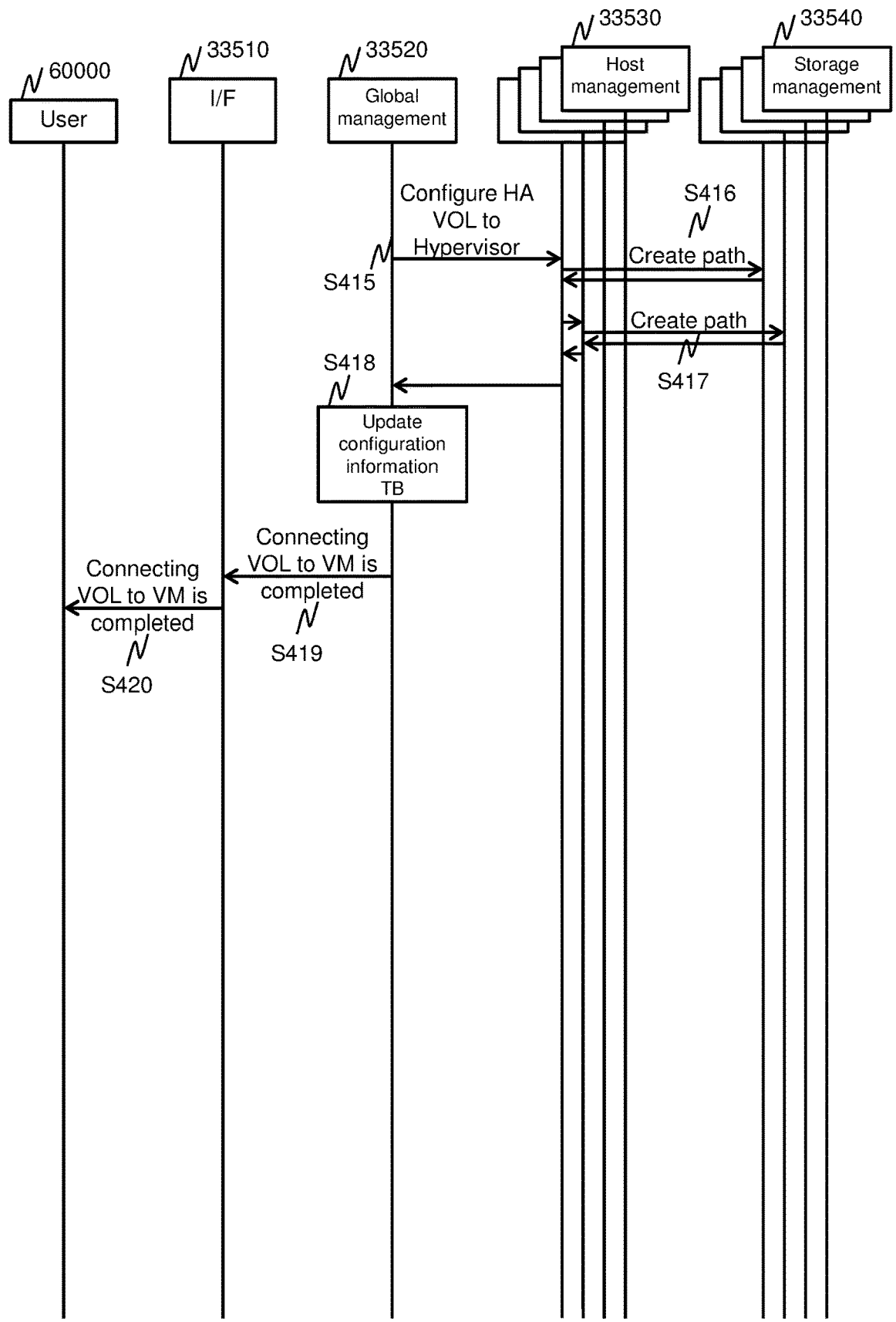
FIG. 35 is a continuation of the sequence of FIG. 34 illustrating the processing of coupling a volume to the virtual machine to which the HA configuration is applied to the host and the storage.

FIG. 34 and FIG. 35 are a sequence illustrating the processing of coupling a volume to the virtual machine to which the HA configuration is applied to the host and the storage.

First, in Step S401 in FIG. 34, the user 60000 instructs the virtual machine management I/F program 33510 to couple a predetermined volume to a predetermined virtual machine.

Next, in Step S402, the virtual machine management I/F program 33510 instructs the global management program 33520 to couple the volume to the virtual machine.

Next, in Step S403, the global management program 33520 refers to the all virtual machine pair management table 33300 and confirms a pair type 33302 of the predetermined VM pair ID 33301. Here, the pair type 33302 is "HA".

Next, in Step S404, the global management program 33520 refers to the all volume management table 33230 and the all volume pair generatable configuration management table 33240, to select a pool on the SVOL side capable of generating the HA pair with a predetermined volume that is instructed to be connected, and select a pool for which the volume for the Quorum is created. The method of selecting each pool is similar to that of Step S203 in Embodiment 1.

Next, in Step S405 to Step S413, the global management program 33520 performs the PVOL creation, the SVOL creation, the Quorum coupling, and the HA pair creation for the storage management program 33540. When the HA pair is created in Step S411, the global management program 33520 refers to the all volume pair management table 33250 and the all virtual machine management table 33280, and determines a consistency group ID that is the same as that of the HA pair volume already connected to a predetermined VM, to thereby perform the creation of the HA pair.

Next, in Step S415 to Step S417, the global management program 33520 monitors the created HA pair volume, and creates a path for each VM of a predetermined host HA pair.

Next, in Step S418, the global management program 33520 reflects the contents of the change in configuration of described above in the configuration management table. At this time, the global management program 33520 may perform the configuration information TB update processing of Step S100 again.

Next, in Step S419, the global management program 33520 returns the completion of the coupling of the volume to the virtual machine to the virtual machine management user I/F program.

Next, in Step S420, the virtual machine management user I/F program 33510 notifies the user 60000 of the completion of the coupling of the volume to the virtual machine.

The Embodiments of this invention described above are examples for describing this invention, and are not intended to limit the scope of this invention to only those Embodiments. Those skilled in the art can embody this invention in various other aspects without departing from the scope of this invention.

REFERENCE SIGNS LIST

10000 Host
11000 CPU
12000 Secondary storage device
13000 Memory
13020 Hypervisor
13030 Virtual machine program
14000 Input-output device
15000 Bus
16000 Initiator port
17000 Management interface
20000 Storage
21000 CPU
22000 Storage device
23000 Memory
24000 Cache memory
25000 Bus
26000 Initiator port
27000 Target port
28000 Management interface
30000 Management server
31000 CPU
32000 Secondary storage device
33000 Memory
34000 Input-output device
35000 Bus
36000 Management interface
40000 Network 41000 Network
50000 Data center

The invention claimed is:

1. A management computer configured to manage resources of a computer system which has a plurality of server resources and a plurality of storage resources and which is configured to combine the server resources and the storage resources and allocate the combined resources to virtual machines, the management computer comprising:

a memory configured to store management information and management programs; and a CPU configured to refer to the management information and execute the management programs, wherein the management information includes storage management information for use in determining whether the plurality of storage resources can be paired in a redundant configuration based at least on a vendor name of the storage resources, and also includes couplable configuration management information for use in determining whether the plurality of storage resources and the plurality of server resources can be connected to each other based at least on identifications (IDs) of the storage resources and the server resources that are capable of communicating with each other via a network, and wherein the CPU is configured to:

when deploying the virtual machine, first determine storage resources to be paired in a redundant configuration by reference to the storage management information, then select, by reference to the couplable configuration management information, server resources each of which can be connected to a respective one of the storage resources to be paired in the redundant configuration, and pair the selected server resources in the redundant configuration;

allocate the storage resources to be paired in the redundant configuration to a primary storage and a secondary storage of the redundant configuration, to thereby cause a first apparatus other than the primary storage and the secondary storage to store storage quorum information for allowing the primary storage and the secondary storage to confirm existence of each other, the storage quorum information storing the vendor names of the storage resources; and allocate the server resources to be paired in the redundant configuration to a primary server and a secondary server of the redundant configuration, to thereby cause a second apparatus other than the primary server and the secondary server to store server quorum information for allowing the primary server and the secondary server to confirm existence of each other, the server quorum information storing the IDs of the storage resources and the server resources that are capable of communicating with each other via the network.

2. The management computer according to claim 1, wherein the first apparatus and the second apparatus correspond to a same apparatus.

3. A management computer configured to manage resources of a computer system which has a plurality of server resources and a plurality of storage resources and which is configured to combine the server resources and the storage resources and allocate the combined resources to virtual machines, the management computer comprising:

a memory configured to store management information and management programs; and a CPU configured to refer to the management information and execute the management programs, wherein the plurality of server apparatuses and the plurality of storage apparatuses are distributed among a plurality of sites that do not simultaneously malfunction due to a same accident, wherein the management information includes storage management information for use in determining whether the plurality of storage resources can be paired in a redundant configuration based at least on vendor names of the storage resources, and also includes couplable configuration management information for use in determining whether the plurality of storage resources and the plurality of server resources can be connected to each other based at least on IDs of the storage resources and the server resources that are capable of communicating with each other via a network, and wherein the CPU is configured to:

when deploying the virtual machine, first determine storage resources to be paired in a redundant configuration by reference to the storage management information so that apparatuses configured to store storage resource information and storage quorum information of the storage resources to be paired in the redundant configuration are in mutually different sites, the storage quorum information storing the vendor names of the storage resources;

then select, by reference to the couplable configuration management information, server resources each of which can be connected to a respective one of the storage resources to be paired in the redundant configuration, such that apparatuses configured to store server resource information and server quorum information of the server resources to be paired in the redundant configuration are in mutually different sites, the server quorum information storing the IDs of the storage resources and the server resources that are capable of communicating with each other via the network; and select the storage resource and the server resource so that pair of the redundant configuration do not malfunction simultaneously due to the same accident.

4. The management computer according to claim 1, wherein the CPU is configured to configure, when there are a plurality of pairs of the storage resources of the redundant configuration, a consistency group which includes the plurality of pairs of the storage resources and in which data consistency among all the pairs is established.

5. A resource management method for managing resources of a computer system which has a plurality of server resources and a plurality of storage resources and which combines the server resources and the storage resources and allocates the combined resources to virtual machines, the resource management method comprising the steps of:

storing management information including storage management information for use in determining whether the plurality of storage resources can be paired in a redundant configuration based at least on vendor names of the storage resources, and including couplable configuration management information for use in determining whether the plurality of storage resources and the plurality of server resources can be connected to each other based at least on IDs of the storage resources and the server resources that are capable of communicating with each other via a network;

determining storage resources to be paired in a redundant configuration by reference to the storage management information, when deploying the virtual machine;

selecting, by reference to the couplable configuration management information, server resources each of which can be connected to a respective one of the storage resources to be paired in the redundant configuration, and pairing the selected server resources in the redundant configuration, when deploying the virtual machine;

allocating the storage resources to be paired in the redundant configuration to a primary storage and a secondary storage of the redundant configuration, to thereby cause a first apparatus other than the primary storage and the secondary storage to store storage quorum information for allowing the primary storage and the secondary storage to confirm existence of each other the storage quorum information storing the vendor names of the storage resources; and allocating the server resources to be paired in the redundant configuration to a primary server and a secondary server of the redundant configuration, to thereby cause a second apparatus other than the primary server and the secondary server to store server quorum information for allowing the primary server and the secondary server to confirm existence of each other, the server quorum information storing the IDs of the storage resources and the server resources that are capable of communicating with each other via the network.

6. The resource management method according to claim 5, wherein the first apparatus and the second apparatus correspond to a same apparatus.

7. The resource management method according to claim 5, comprising:

distributing the plurality of server apparatuses and the plurality of storage apparatuses among a plurality of sites that do not simultaneously malfunction due to a same accident;

configuring the server resources to be paired in the redundant configuration and an apparatus that stores server quorum information to be in mutually different sites; and configuring the storage resources to be paired in the redundant configuration and an apparatus that stores storage quorum information to be in mutually different sites.

8. The resource management method according to claim 5, comprising causing the management computer to configure, when there are a plurality of pairs of the storage resources of the redundant configuration, a consistency group which includes the plurality of pairs of the storage resources and in which data consistency among all the pairs is established.

* * * * *